(12) United States Patent
Huang et al.

(10) Patent No.: US 10,171,567 B2
(45) Date of Patent: Jan. 1, 2019

(54) LOAD BALANCING COMPUTER DEVICE, SYSTEM, AND METHOD

(71) Applicant: HUAWEI TECHNOLOGIES CO.,LTD., Shenzhen, Guangdong (CN)

(72) Inventors: Denghui Huang, Hangzhou (CN); Daxiang Kang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/020,960

(22) Filed: Jun. 27, 2018

(65) Prior Publication Data

US 2018/0332105 A1    Nov. 15, 2018

Related U.S. Application Data

(63) Continuation of application No. PCT/CN2016/105945, filed on Nov. 15, 2016.

(30) Foreign Application Priority Data

Dec. 30, 2015  (WO) ................ PCT/CN2015/099961

(51) Int. Cl.
*H04L 29/08* (2006.01)
(52) U.S. Cl.
CPC ............................... *H04L 67/1002* (2013.01)
(58) Field of Classification Search
None
See application file for complete search history.

(56) References Cited

U.S. PATENT DOCUMENTS

| | | | |
|---|---|---|---|
| 8,427,956 B1* | 4/2013 | Thai | H04L 67/1004 370/236 |
| 9,038,091 B2 | 5/2015 | Jonnagadla et al. | |
| 9,775,008 B2* | 9/2017 | Patel | H04L 67/1002 |
| 9,813,509 B1* | 11/2017 | Visser | H04L 67/16 |
| 2011/0016151 A1 | 1/2011 | Wang | |

(Continued)

FOREIGN PATENT DOCUMENTS

| | | |
|---|---|---|
| CN | 101719081 A | 6/2010 |
| CN | 103220354 A | 7/2013 |

(Continued)

*Primary Examiner* — Brian Whipple
(74) *Attorney, Agent, or Firm* — Huawei Technologies Co., Ltd.

(57) ABSTRACT

A computer device, a system, and a load balancing method are provided. A load balancing virtual machine is created on the computer device. When load balancing processing needs to be performed on a service of a virtual machine of the computer device, a related service packet is sent to the load balancing virtual machine of the computer device, so as to perform load balancing processing, thereby avoiding a processing delay caused by congestion of centralized load balancing. In addition, when a computer device is faulty, a virtual machine of the computer device goes offline accordingly, and a load balancing requirement is not generated any more. Therefore, when a fault of a single computer device causes a fault of a load balancing virtual machine, there is no service interruption that is caused by active/standby switchover because of the fault of the load balancing virtual machine.

13 Claims, 11 Drawing Sheets

(56) References Cited

U.S. PATENT DOCUMENTS

| | | | | |
|---|---|---|---|---|
| 2012/0084406 A1* | 4/2012 | Kumbalimutt | ...... | H04L 12/4641 709/220 |
| 2012/0246637 A1 | 9/2012 | Kreeger et al. | | |
| 2013/0159487 A1 | 6/2013 | Patel et al. | | |
| 2013/0185715 A1* | 7/2013 | Dunning | ............ | G06F 9/45558 718/1 |
| 2016/0173636 A1* | 6/2016 | Wang | .................. | H04L 67/2842 709/213 |
| 2017/0353888 A1* | 12/2017 | Weckstrom | ........... | H04W 28/08 |

FOREIGN PATENT DOCUMENTS

| | | |
|---|---|---|
| CN | 104168323 A | 11/2014 |
| CN | 104780115 A | 7/2015 |
| CN | 104917805 A | 9/2015 |
| CN | 104935672 A | 9/2015 |

\* cited by examiner

LOAD BALANCING COMPUTER DEVICE, SYSTEM, AND METHOD

CROSS-REFERENCE TO RELATED APPLICATIONS

This application is a continuation of International Application No. PCT/CN2016/105945, filed on Nov. 15, 2016, which claims priority to International Application No. PCT/CN2015/099961, filed on Dec. 30, 2015. The disclosures of the aforementioned applications are hereby incorporated by reference in their entireties.

TECHNICAL FIELD

The present application relates to information technologies, and in particular, to system and method for balancing load among devices in system.

BACKGROUND

A load balancer is a server set that includes multiple servers arranged in a symmetric manner. All the servers have equal standing, and each server may independently provide service externally without assistance from other servers. Through load sharing, requests received from the outside are equally allocated to servers in the symmetric structure, and a server that receives a request independently responds to the originator of the request. In load balancing, the requests of the client can be equally allocated to a server array, so that important data is rapidly obtained, and a problem of a large amount of concurrent access is avoided. In this kind of clustering technology, performance that approximates to that of a mainframe can be achieved with the least amount of investment.

With the development of cloud computing technology, various services are migrated to a cloud environment, and cloudification requirements are also imposed on load balancers. In response, a virtual load balancer (vLB) is developed.

Currently, most virtual load balancers are virtualized and software-defined conventional load balancers. This cannot meet requirements of cloud computing for high reliability, horizontal extension, and high bandwidth on the vLB. To improve vLB service reliability, services are usually provided by using two vLBs in a primary-secondary relationship. Heartbeat information is transferred between the primary vLB and the secondary vLB by using the Virtual Router Redundancy Protocol (VRRP). When the secondary vLB finds that the primary vLB is down, the secondary vLB continues working in succession to the primary vLB. In the primary-secondary relationship implemented by using the VRRP, after the primary vLB is down, the secondary vLB continues working. The active/standby switchover needs an amount of time, and this causes traffic interruption in the switchover process. In addition, one load balancing node needs to perform load balancing on all load balancing services. When load balancing access traffic is large, bandwidth of the centralized load balancing node becomes a bottleneck, and service congestion and delays are caused.

SUMMARY

Embodiments of the present application provide computer device, system, and method for load balancing, to resolve the problem of service interruption caused by switchover between an active load balancing mode and a standby load balancing mode, and congestion caused by centralized load balancing.

In one aspect, an embodiment of the present application provides a load balancing method, applied to a computer system that includes at least two computer devices, where each computer device includes a central processing unit and a memory, the at least two computer devices include a first computer device and a second computer device, the first computer device is used as a cloud management platform, a virtual machine that initiates a service runs on the second computer device, and the service is a load balancing service; and including:

obtaining, by the first computer device, configuration information of a load balancer that is to be created on the second computer device, where the configuration information of the load balancer includes an identifier of the load balancer and a virtual IP address VIP of the load balancer, and the VIP of the load balancer indicates the load balancing service;

creating, by the first computer device, the load balancer on the second computer device according to the configuration information;

configuring, by the first computer device, a forwarding mode of the load balancing service on the second computer device, where in the forwarding mode, a service packet of the load balancing service initiated by the virtual machine that is of the second computer device and that initiates the service is directionally forwarded to the load balancer;

sending, by the virtual machine that is of the second computer device and that initiates the service, the service packet to the load balancer according to the forwarding mode; and after receiving the service packet, selecting, by the load balancer of the second computer device, at least one back-end server to execute the service, where the back-end server is used to execute the load balancing service.

In a possible design, the configuring, by the first computer device, a forwarding mode of the load balancing service on the second computer device includes:

configuring, by the first computer device, a virtual switch deployed on the second computer device, and so as to send a media access control (MAC) address of the load balancer to the virtual machine that initiates the service; and the sending, by the virtual machine that is of the second computer device and that initiates the service, the service packet to the load balancer according to the forwarding mode includes:

sending, by the virtual machine that initiates the service, the service packet for which the MAC address of the load balancer is used as a destination address, and sending, by the virtual switch, the service packet to the load balancer according to the destination address of the service packet.

In a possible design, before the sending, by the virtual machine that initiates the service, the service packet for which the MAC address of the load balancer is used as a destination address, the method further includes:

sending, by the virtual machine that initiates the service, a control packet to the virtual switch, where the control packet carries the VIP; and sending, by the virtual switch, a response message of the control packet to the virtual machine that initiates the service, where the response message carries the MAC address of the load balancer.

In a possible design, the control packet is an Address Resolution Protocol (ARP) packet or an Internet Control Message Protocol (ICMP) packet.

In a possible design, the configuring, by the first computer device, a forwarding mode of the load balancing service on the second computer device includes:

instructing, by the first computer device, the load balancer to send a MAC address of the load balancer to the virtual machine that initiates the service; or configuring, by the first computer device, a MAC address of the load balancer on the virtual machine that initiates the service; and correspondingly, the sending, by the virtual machine that is of the second computer device and that initiates the service, the service packet to the load balancer according to the forwarding mode includes:

sending, by the virtual machine that initiates the service, the service packet for which the MAC address of the load balancer is used as a destination address, and sending, by a virtual switch deployed on the second computer device, the service packet to the load balancer according to the destination address of the service packet.

In a possible design, the creating, by the first computer device, the load balancer on the second computer device according to the configuration information includes:

creating, by the first computer device, the load balancer after creating, on the second computer device, the first virtual machine that initiates the load balancing service.

In a possible design, the method further includes:

deleting, by the first computer device, the created load balancer after a last virtual machine that initiates the load balancing service and that is created on the second computer device is deleted.

In a possible design, the method further includes:

directly returning, by the selected back-end server, a result of executing the service to the virtual machine that initiates the service; or returning, by the selected back-end server, a result of executing the service to the load balancer, and returning, by the load balancer, the execution result to the virtual machine that initiates the service.

In another aspect, an embodiment of the present application provides a load balancing method, applied to a computer system that includes at least three computer devices, where each computer device includes a central processing unit and a memory, the at least three computer devices include a first computer device, the first computer device is used as a cloud management platform, computer devices other than the first computer device in the at least three computer devices are used as service computer devices, a virtual machine that initiates a service runs on each service computer device, and the service is a load balancing service; and including:

obtaining, by the first computer device, configuration information of a load balancer that is to be created on each service computer device, where the configuration information of the load balancer includes an identifier of the load balancer and a virtual IP address VIP of the load balancer, and the VIP of the load balancer indicates the load balancing service;

creating, by the first computer device, the local load balancer of each service computer device on each service computer device according to the configuration information of the load balancer that is to be created on each service computer device; and configuring, by the first computer device, a forwarding mode of the load balancing service on each service computer device, where in the forwarding mode, a service packet of the load balancing service initiated by the virtual machine that is of each service computer device and that initiates the service is directionally forwarded to the local load balancer, so that the local load balancer of each service computer device performs load balancing processing on the service packet initiated by the virtual machine that is of the service computer device and that initiates the service.

In a possible design, the configuring, by the first computer device, a forwarding mode of the load balancing service on each service computer device includes:

configuring, by the first computer device, a virtual switch deployed on each service computer device, and so as to send a MAC address of the local load balancer to the local virtual machine that initiates the service.

In a possible design, after the configuring, by the first computer device, a virtual switch deployed on each service computer device, and so as to send a MAC address of the local load balancer to the local virtual machine that initiates the service, the method further includes:

sending, by the virtual machine that is of each service computer device and that initiates the service, a control packet to the local virtual switch, where the control packet carries the VIP; and sending, by the local virtual switch of each service computer device, a response message of the control packet to the local virtual machine that initiates the service, where the response message carries the MAC address of the local load balancer.

In a possible design, creating, by the first computer device, the local load balancer of each service computer device on each service computer device according to the configuration information of the load balancer that is to be created on each service computer device includes:

learning, by the first computer device, that the first virtual machine that initiates the service is created on a first service computer device, and creating a load balancer of the first service computer device on the first service computer device until the local load balancer of each service computer device is created on each service computer device.

In a possible design, the load balancer includes a load balancing virtual machine, a load balancing container, or a load balancing namespace.

In another aspect, an embodiment of the present application provides a load balancing method, applied to a computer system that includes at least two computer devices, where each computer device includes a central processing unit and a memory, the at least two computer devices include a first computer device and a second computer device, the first computer device is used as a cloud management platform, a virtual machine that initiates a service runs on the second computer device, and the service is a load balancing service; and including:

obtaining, by the first computer device, configuration information of a load balancer that is to be created on the second computer device, where the configuration information of the load balancer includes an identifier of the load balancer and a virtual IP address VIP of the load balancer, and the VIP of the load balancer indicates the load balancing service;

creating, by the first computer device, the load balancer on the second computer device according to the configuration information; and configuring, by the first computer device, a forwarding mode of the load balancing service on the second computer device, where in the forwarding mode, a service packet of the load balancing service initiated by the virtual machine that is of the second computer device and that initiates the service is directionally forwarded to the load balancer, so that after receiving the service packet, the load balancer selects a back-end server that executes the service.

In a possible design, the configuring, by the first computer device, a forwarding mode of the load balancing service on the second computer device includes:

configuring, by the first computer device, a virtual switch deployed on the second computer device, and so as to send a MAC address of the load balancer to the virtual machine that initiates the service, so that the virtual machine that initiates the service sends the service packet for which the MAC address of the load balancer is used as a destination address.

In a possible design, after the configuring, by the first computer device, a virtual switch deployed on the second computer device, and so as to send a MAC address of the load balancer to the virtual machine that initiates the service, the method further includes:

sending, by the virtual machine that initiates the service, a control packet to the virtual switch, where the control packet carries the VIP; and sending, by the virtual switch, a response message of the control packet to the virtual machine that initiates the service, where the response message carries the MAC address of the load balancer.

In a possible design, the creating, by the first computer device, the load balancer on the second computer device according to the configuration information includes:

creating, by the first computer device, the load balancer after creating, on the second computer device, the first virtual machine that initiates the load balancing service.

In a possible design, the method further includes:

deleting, by the first computer device, the created load balancer after a last virtual machine that initiates the load balancing service and that is created on the second computer device is deleted.

In another aspect, an embodiment of the present application provides a load balancing computer system, including at least two computer devices, where each computer device includes a central processing unit and a memory, the at least two computer devices include a first computer device and a second computer device, the first computer device is used as a cloud management platform, a virtual machine that initiates a service runs on the second computer device, and the service is a load balancing service, where the first computer device obtains configuration information of a load balancer that is to be created on the second computer device, where the configuration information of the load balancer includes an identifier of the load balancer and a virtual IP address VIP of the load balancer, and the VIP of the load balancer indicates the load balancing service;

the first computer device creates the load balancer on the second computer device according to the configuration information;

the first computer device configures a forwarding mode of the load balancing service on the second computer device, where in the forwarding mode, a service packet of the load balancing service initiated by the virtual machine that is of the second computer device and that initiates the service is directionally forwarded to the load balancer;

the virtual machine that is of the second computer device and that initiates the service sends the service packet to the load balancer according to the forwarding mode; and after receiving the service packet, the load balancer of the second computer device selects at least one back-end server to execute the service, where the back-end server is used to execute the load balancing service.

In a possible design, that the first computer device configures a forwarding mode of the load balancing service on the second computer device includes:

the first computer device configures a virtual switch deployed on the second computer device, so as to send a MAC address of the load balancer to the virtual machine that initiates the service; and that the virtual machine that is of the second computer device and that initiates the service sends the service packet to the load balancer according to the forwarding mode includes:

the virtual machine that initiates the service sends the service packet for which the MAC address of the load balancer is used as a destination address, and the virtual switch sends the service packet to the load balancer according to the destination address of the service packet.

In a possible design, before the virtual machine that initiates the service sends the service packet for which the MAC address of the load balancer is used as the destination address, the virtual machine that initiates the service sends a control packet to the virtual switch, where the control packet carries the VIP; and the virtual switch sends a response message of the control packet to the virtual machine that initiates the service, where the response message carries the MAC address of the load balancer.

In a possible design, the control packet is an Address Resolution Protocol (ARP) packet or an Internet Control Message Protocol (ICMP) packet.

In a possible design, that the first computer device configures a forwarding mode of the load balancing service on the second computer device includes:

the first computer device instructs the load balancer to send a MAC address of the load balancer to the virtual machine that initiates the service; or the first computer device configures a MAC address of the load balancer on the virtual machine that initiates the service; and correspondingly, that the virtual machine that is of the second computer device and that initiates the service sends the service packet to the load balancer according to the forwarding mode includes:

the virtual machine that initiates the service sends the service packet for which the MAC address of the load balancer is used as a destination address, and a virtual switch deployed on the second computer device sends the service packet to the load balancer according to the destination address of the service packet.

In a possible design, that the first computer device creates the load balancer on the second computer device according to the configuration information includes:

the first computer device creates the load balancer after creating, on the second computer device, the first virtual machine that initiates the load balancing service.

In a possible design, the first computer device deletes the created load balancer after a last virtual machine that initiates the load balancing service and that is created on the second computer device is deleted.

In a possible design, the selected back-end server directly returns a result of executing the service to the virtual machine that initiates the service; or the selected back-end server returns a result of executing the service to the load balancer, and the load balancer returns the execution result to the virtual machine that initiates the service.

In another aspect, an embodiment of the present application provides a load balancing computer system, where the computer system includes at least three computer devices, each computer device includes a central processing unit and a memory, the at least three computer devices include a first computer device, the first computer device is used as a cloud management platform, computer devices other than the first computer device in the at least three computer devices are used as service computer devices, a virtual machine that initiates a service runs on each service computer device, and the service is a load balancing service, where the first computer device obtains configuration information of a load balancer that is to be created on each service computer device, where the configuration information of the load balancer includes an identifier of the load balancer and a virtual IP address VIP of the load balancer, and the VIP of the load balancer indicates the load balancing service;

the first computer device creates the local load balancer of each service computer device on each service computer device according to the configuration information of the load balancer that is to be created on each service computer device; and the first computer device configures a forwarding mode of the load balancing service on each service computer device, where in the forwarding mode, a service packet of the load balancing service initiated by the virtual machine that is of each service computer device and that initiates the service is directionally forwarded to the local load balancer, so that the local load balancer of each service computer device performs load balancing processing on the service packet initiated by the virtual machine that is of the service computer device and that initiates the service.

In a possible design, that the first computer device configures a forwarding mode of the load balancing service on each service computer device includes:

the first computer device configures a virtual switch deployed on each service computer device, so as to send a MAC address of the local load balancer to the local virtual machine that initiates the service.

In a possible design, after the first computer device configures the virtual switch deployed on each service computer device, and sends the MAC address of the local load balancer to the local virtual machine that initiates the service, the virtual machine that is of each service computer device and that initiates the service sends a control packet to the local virtual switch, where the control packet carries the VIP; and the local virtual switch of each service computer device sends a response message of the control packet to the local virtual machine that initiates the service, where the response message carries the MAC address of the local load balancer.

In a possible design, before the first computer device creates the load balancer on each service computer device according to the configuration information, the first computer device learns that the first virtual machine that initiates the service is created on a first service computer device, and creates a load balancer of the first service computer device on the first service computer device until the local load balancer of each service computer device is created on each service computer device.

In a possible design, the load balancer includes a load balancing virtual machine, a load balancing container, or a load balancing namespace.

In another aspect, an embodiment of the present application provides a load balancing computer system, where the computer system includes at least two computer devices, each computer device includes a central processing unit and a memory, the at least two computer devices include a first computer device and a second computer device, the first computer device is used as a cloud management platform, a virtual machine that initiates a service runs on the second computer device, and the service is a load balancing service, where the first computer device obtains configuration information of a load balancer that is to be created on the second computer device, where the configuration information of the load balancer includes an identifier of the load balancer and a virtual IP address VIP of the load balancer, and the VIP of the load balancer indicates the load balancing service;

the first computer device creates the load balancer on the second computer device according to the configuration information; and the first computer device configures a forwarding mode of the load balancing service on the second computer device, where in the forwarding mode, a service packet of the load balancing service initiated by the virtual machine that is of the second computer device and that initiates the service is directionally forwarded to the load balancer, so that after receiving the service packet, the load balancer selects a back-end server that executes the service.

In a possible design, that the first computer device configures a forwarding mode of the load balancing service on the second computer device includes:

the first computer device configures a virtual switch deployed on the second computer device, so as to send a MAC address of the load balancer to the virtual machine that initiates the service, so that the virtual machine that initiates the service sends the service packet for which the MAC address of the load balancer is used as a destination address.

In a possible design, after the first computer device configures the virtual switch deployed on the second computer device, and sends the MAC address of the load balancer to the virtual machine that initiates the service, the virtual machine that initiates the service sends a control packet to the virtual switch, where the control packet carries the VIP; and the virtual switch sends a response message of the control packet to the virtual machine that initiates the service, where the response message carries the MAC address of the load balancer.

In a possible design, that the first computer device creates the load balancer on the second computer device according to the configuration information includes:

the first computer device creates the load balancer after creating, on the second computer device, the first virtual machine that initiates the load balancing service.

In a possible design,
the first computer device deletes the created load balancer after a last virtual machine that initiates the load balancing service and that is created on the second computer device is deleted.

To achieve the foregoing objective, a first aspect of the embodiments of the present application provides a computer device, including a central processing unit CPU, a memory, and a storage device, where the computer device further includes a first virtual machine, a load balancing virtual machine, and a virtual switch, and the first virtual machine and the load balancing virtual machine are virtual machines that are created on the computer device, where the first virtual machine is configured to send a service packet;

the virtual switch is configured to: receive the service packet sent by the first virtual machine, and forward the service packet only to the load balancing virtual machine when load balancing processing needs to be performed on the service packet; and the load balancing virtual machine is configured to: receive the service packet forwarded by the virtual switch, and forward the service packet in a load balancing manner.

That the load balancing virtual machine forwards the service packet in a load balancing manner may be as follows: After receiving the service packet, the load balancing virtual machine first determines whether a back-end server has been allocated to the service packet to serve the service packet, and if the back-end server has been allocated, sends the service packet to the back-end server that has been allocated. If the back-end server has not yet been allocated, a back-end server is selected by using a load balancing algorithm, to serve the service packet. The load balancing algorithm includes but is not limited to round robin, weighted round robin, a random algorithm, least connections, source address hash, or location-based weighted round robin. In the location-based weighted round robin manner, a back-end server of a computer device on which a virtual machine that initiates a service packet is located may be preferentially selected. In this way, a speed of processing the service packet by the back-end server can be increased, and network bandwidth can be saved.

With reference to the first aspect, in a first possible implementation of the first aspect of the embodiments of the present application, that the virtual switch forwards the service packet only to the load balancing virtual machine includes:

the virtual switch sends a MAC address of the load balancing virtual machine to the first virtual machine, so that the first virtual machine sends the service packet based on the obtained MAC address of the load balancing virtual machine, and the virtual switch forwards the service packet to the load balancing virtual machine; or the load balancing virtual machine sends a MAC address of the load balancing virtual machine to the first virtual machine, so that the first virtual machine sends the service packet based on the obtained MAC address of the load balancing virtual machine, and the virtual switch forwards the service packet to the load balancing virtual machine; or the first virtual machine sends the service packet based on a pre-configured MAC address of the load balancing virtual machine, and the virtual switch forwards the service packet to the load balancing virtual machine.

With reference to the first possible implementation of the first aspect, in a second possible implementation of the first aspect of the embodiments of the present application, that the virtual switch sends a MAC address of the load balancing virtual machine to the first virtual machine includes:

the virtual switch receives a control packet sent by the first virtual machine, and returns a control response packet to the first virtual machine, where the control response packet includes the MAC address of the load balancing virtual machine. That is, the virtual switch may perform directional processing on the service packet of the first virtual machine according to a configured forwarding mode, so that the virtual switch forwards the service packet to the load balancing virtual machine.

With reference to the second possible implementation of the first aspect, in a third possible implementation of the first aspect of the embodiments of the present application, the control packet is an Address Resolution Protocol ARP packet or an Internet Control Message Protocol (ICMP) packet. For example, the control packet may be an Address Resolution Protocol (ARP) packet, the forwarding mode may be an ARP cache mode, and the first virtual machine may send the MAC address of the first load balancing virtual machine to the first virtual machine in the ARP cache mode. Optionally, when the control packet is an ICMP packet, the forwarding mode may be a Neighbor Discovery Protocol (NDP) cache mode.

With reference to the first aspect, or the first, the second, or the third possible implementation of the first aspect, in a fourth possible implementation of the first aspect of the embodiments of the present application, the computer device further includes a virtual load balancing proxy unit, where the virtual load balancing proxy unit is configured to: receive configuration information for creating a load balancing virtual machine, control creation or deletion of the load balancing virtual machine, and control establishment of a connection between the load balancing virtual machine and the virtual switch.

When instructing a virtual machine management unit to create the first load balancing virtual machine according to the configuration information for creating a load balancing virtual machine, the virtual load balancing proxy unit sends notification information to the virtual machine management unit. The notification information includes virtual machine parameter information for creating the first load balancing virtual machine. The virtual machine parameter information of the first load balancing virtual machine includes but is not limited to information such as a quantity of virtual central processing units, a size of a virtual memory, and a logical network on which the load balancing virtual machine is located.

The configuration information for creating a load balancing virtual machine is delivered by a user (as used herein, the term "user" means a device used by a user) by using a cloud management platform (the second computer device). The configuration information includes but is not limited to an identifier of the load balancing virtual machine, an IP address of the load balancing virtual machine, and information about a back-end server related to the load balancing virtual machine. The information about the back-end server includes but is not limited to an identifier of the back-end server, an Internet Protocol (IP) address of the back-end server, or a health check method of the back-end server. The health check method of the back-end server refers to a method in which the load balancing virtual machine checks a health status of the back-end server. The back-end server is a server that provides a specific service. The load balancing virtual machine selects, according to a received service packet in a load balancing manner, for example, by using a load balancing algorithm, one server from back-end servers as a server that processes the service packet. In the embodiments of the present application, the back-end server may be a virtual machine, or may be a specific physical server.

Optionally, when the first virtual machine is a virtual machine that is created by the user who creates the load balancing virtual machine, and the first virtual machine is the first virtual machine that is created by the user on the first computer device, the virtual load balancing proxy unit starts creation of the load balancing virtual machine. Likewise, when a last virtual machine configured by the user who has configured a virtual load balancing service is deleted, the first virtual load balancing proxy unit starts deletion of the load balancing virtual machine.

With reference to the first aspect, or the first, the second, the third, or the fourth possible implementation of the first aspect, in a fifth possible implementation of the first aspect of the embodiments of the present application, the computer device further includes a second virtual machine, and the second virtual machine has a capability of processing the service packet of the first virtual machine, where when the load balancing virtual machine determines, by using a load balancing algorithm, that the second virtual machine processes the service packet of the first virtual machine, the second virtual machine receives the service packet forwarded by the load balancing virtual machine, and sends a result of processing the service packet to the load balancing virtual machine; and the load balancing virtual machine is further configured to send, to the first virtual machine by using the virtual switch, the result of processing the service packet by the second virtual machine.

A second aspect of the embodiments of the present application provides a computer system, including a first computer device and a second computer device, where the first computer device and the second computer device each include a central processing unit CPU, a memory, and a storage device, the first computer device further includes a first virtual machine, a first load balancing virtual machine, and a first virtual switch, and the first virtual machine and the first load balancing virtual machine are virtual machines that are created on the first computer device, where the first virtual machine is configured to send a service packet;

the first virtual switch is configured to: receive the service packet sent by the first virtual machine, and forward the service packet only to the first load balancing virtual machine when load balancing processing needs to be performed on the service packet; and the first load balancing virtual machine is configured to: receive the service packet forwarded by the first virtual switch, and forward the service packet in a load balancing manner.

That the first load balancing virtual machine forwards the service packet in a load balancing manner may be as follows: After receiving the service packet, the first load balancing virtual machine first determines whether a back-end server has been allocated to the service packet to serve the service packet, and if the back-end server has been allocated, sends the service packet to the back-end server that has been allocated. If the back-end server has not yet been allocated, a back-end server is selected by using a load balancing algorithm, to serve the service packet. The load balancing algorithm includes but is not limited to round robin, weighted round robin, a random algorithm, least connections, source address hash, or location-based weighted round robin. In the location-based weighted round robin manner, a back-end server of a computer device on which a virtual machine that initiates a service packet is located may be preferentially selected. In this way, a speed of processing the service packet by the back-end server can be increased, and network bandwidth can be saved.

The second computer device may be a cloud platform management device in the computer system, and implements management and configuration on the first computer device. The management and configuration include performing configuration and management on a virtual machine of the first computer device.

With reference to the second aspect, in a first possible implementation of the second aspect of the embodiments of the present application, that the first virtual switch forwards the service packet only to the first load balancing virtual machine includes:

the first virtual switch sends a MAC address of the first load balancing virtual machine to the first virtual machine, so that the first virtual machine sends the service packet based on the obtained MAC address of the first load balancing virtual machine, and the first virtual switch forwards the service packet to the first load balancing virtual machine; or the first load balancing virtual machine sends a MAC address of the first load balancing virtual machine to the first virtual machine, so that the first virtual machine sends the service packet based on the MAC address of the first load balancing virtual machine, and the first virtual switch forwards the service packet to the first load balancing virtual machine; or the first virtual machine sends the service packet based on a pre-configured MAC address of the first load balancing virtual machine, and the first virtual switch forwards the service packet to the first load balancing virtual machine.

With reference to the first possible implementation of the second aspect, in a second possible implementation of the second aspect of the embodiments of the present application, that the first virtual switch sends a MAC address of the first load balancing virtual machine to the first virtual machine includes: the first virtual switch receives a control packet sent by the first virtual machine, and returns a control response packet to the first virtual machine, where the control response packet includes the MAC address of the first load balancing virtual machine. That is, a virtual machine management unit may configure a forwarding mode of the first virtual switch. The first virtual switch performs directional processing on the service packet of the first virtual machine according to the configured forwarding mode, so that the first virtual switch forwards the service packet to the first load balancing virtual machine.

With reference to the second possible implementation of the second aspect, in a third possible implementation of the second aspect of the embodiments of the present application, the control packet is an Address Resolution Protocol (ARP) packet or an Internet Control Message Protocol (ICMP) packet. For example, the control packet may be an Address Resolution Protocol (ARP) packet, the forwarding mode may be an ARP cache mode, and the first virtual machine may send the MAC address of the first load balancing virtual machine to the first virtual machine in the ARP cache mode. Optionally, when the control packet is an ICMP packet, the forwarding mode may be a Neighbor Discovery Protocol (NDP) cache mode.

With reference to the second aspect, or the first, the second, or the third possible implementation of the second aspect, in a fourth possible implementation of the second aspect of the embodiments of the present application, the first computer device further includes a first virtual load balancing proxy unit, and the second computer device further includes a virtual load balancing management unit and the virtual machine management unit, where the virtual load balancing management unit is configured to: receive configuration information for creating the first load balancing virtual machine, and send the configuration information for creating the first load balancing virtual machine to the first virtual load balancing proxy unit; and the first virtual load balancing proxy unit is configured to: receive the configuration information for creating the first load balancing virtual machine, and instruct the virtual machine management unit to create the first load balancing virtual machine according to the configuration information for creating the first load balancing virtual machine.

When instructing the virtual machine management unit to create the first load balancing virtual machine according to the configuration information for creating the load balancing virtual machine, the first virtual load balancing proxy unit sends notification information to the virtual machine management unit. The notification information includes virtual machine parameter information for creating the first load balancing virtual machine. The virtual machine parameter information of the first load balancing virtual machine includes but is not limited to information such as a quantity of virtual central processing units, a size of a virtual memory, and a logical network on which the load balancing virtual machine is located.

Optionally, the virtual load balancing management unit may directly instruct the virtual machine management unit to create the first load balancing virtual machine according to the configuration information for creating the first load balancing virtual machine.

The configuration information for creating the first load balancing virtual machine is delivered by a user by using a cloud management platform (the second computer device). The configuration information includes but is not limited to an identifier of the load balancing virtual machine, an IP address of the load balancing virtual machine, and information about a back-end server related to the load balancing virtual machine. The information about the back-end server includes but is not limited to an identifier of the back-end server, an Internet Protocol (IP) address of the back-end server, or a health check method of the back-end server. The health check method of the back-end server refers to a method in which the load balancing virtual machine checks a health status of the back-end server. The back-end server is a server that provides a specific service. The load balancing virtual machine selects, according to a received service packet in a load balancing manner, for example, by using a load balancing algorithm, one server from back-end servers as a server that processes the service packet. In the embodiments of the present application, the back-end server may be a virtual machine, or may be a specific physical server.

With reference to the fourth possible implementation of the second aspect, in a fifth possible implementation of the second aspect of the embodiments of the present application, the first virtual load balancing proxy unit is further configured to: instruct the virtual machine management unit to configure a first virtual network interface card for the first load balancing virtual machine and to establish a connection between the first virtual network interface card and the first virtual switch. The virtual machine management unit may establish the connection between the first virtual network interface card and the first virtual switch by configuring a network identifier of the virtual switch, and the network identifier is an identifier of a network interface of the virtual switch. In addition, when establishing the first virtual network interface card according to an instruction of the first virtual load balancing proxy unit, the virtual machine management unit may further assign an IP address and a MAC address to the created first virtual network interface card according to the configuration information for creating the load balancing virtual machine.

With reference to the fourth or the fifth possible implementation of the second aspect, in a sixth possible implementation of the second aspect of the embodiments of the present application, the first virtual machine is a virtual machine that is created by the user who creates the first load balancing virtual machine; the virtual load balancing management unit is further configured to: receive configuration information for creating the first virtual machine, and when it is determined that the first virtual machine is the first virtual machine that is created by the user on the first computer device, notify the first virtual load balancing proxy unit of the information for creating the first virtual machine; and the first virtual load balancing proxy unit is configured to: when receiving a notification for creating the first virtual machine that is sent by the virtual load balancing management unit, instruct the virtual machine management unit to create the first load balancing virtual machine. The virtual load balancing management unit may directly instruct the virtual machine management unit to create the first load balancing virtual machine.

Likewise, when a last virtual machine configured by the user who has configured a virtual load balancing service is deleted, the virtual load balancing management unit instructs the first virtual load balancing proxy unit to instruct the virtual machine management unit to delete the first load balancing virtual machine, or directly instructs the virtual machine management unit to delete the first load balancing virtual machine.

With reference to any one of the second aspect, or the first to the sixth possible implementations of the second aspect, in a seventh possible implementation of the second aspect of the embodiments of the present application, the first computer device further includes a second virtual machine, and the second virtual machine has a capability of processing the service packet of the first virtual machine, where when the first load balancing virtual machine determines, in a load balancing manner, that the second virtual machine processes the service packet of the first virtual machine, the second virtual machine receives the service packet forwarded by the first load balancing virtual machine, and sends a result of processing the service packet to the first load balancing virtual machine; and the first load balancing virtual machine is further configured to send, to the first virtual machine by using the first virtual switch, the result of processing the service packet by the second virtual machine.

With reference to any one of the second aspect, or the first to the seventh possible implementations of the second aspect, in an eighth possible implementation of the second aspect of the embodiments of the present application, the computer system further includes a third computer device, and the third computer device includes a second virtual load balancing proxy unit, a second virtual switch, and a third virtual machine, where the second virtual load balancing proxy unit is configured to: receive configuration information for creating a second load balancing virtual machine that is sent by the virtual load balancing management unit, instruct, based on the configuration information for creating the second load balancing virtual machine, the virtual machine management unit to create the second load balancing virtual machine, and instruct the virtual machine management unit to configure a second virtual network interface card for the second load balancing virtual machine and to establish a connection between the second virtual network interface card and the second virtual switch;

the second virtual switch is configured to: receive a second service packet initiated by the third virtual machine, and forward the second service packet only to the second load balancing virtual machine when load balancing processing needs to be performed on the second service packet; and the second load balancing virtual machine is configured to: receive the second service packet forwarded by the second virtual switch, and forward the second service packet in a load balancing manner.

With reference to the eighth possible implementation of the second aspect, in a ninth possible implementation of the second aspect of the embodiments of the present application, the virtual machine management unit configures a first IP address and a first MAC address for the first load balancing virtual machine, and configures a second IP address and a second MAC address for the second load balancing virtual machine. The first IP address is the same as the second IP address, or the first MAC address is the same as the second MAC address.

Optionally, in addition to the central processing unit (CPU), the memory, and the storage device, the first computer device may include a hardware device such as network hardware. The network hardware may be a switching device (such as a network interface card), a router, and/or another network device, and is configured to implement communication between multiple devices. The multiple devices may be connected in a wireless or wired manner.

With reference to any one of the second aspect, or the first to the ninth possible implementations of the second aspect, in a tenth possible implementation of the second aspect of the embodiments of the present application, the second computer device further includes a virtual load balancing storage device, configured to store configuration information for creating a load balancing virtual machine. The virtual load balancing storage device may be a storage device of the second computer device, or may be a storage device independent of the second computer device.

A third aspect of the embodiments of the present application provides a computer system, including a first computer device, a second computer device, and a third computer device, where the first computer device, the second computer device, and the third computer device each include a central processing unit (CPU), a memory, and a storage device, the second computer device performs configuration and management on virtual machines of the first computer device and the third computer device, the first computer device includes a first virtual switch, the third computer device includes a second virtual switch, and the second computer device is configured to: receive configuration information for creating a load balancing virtual machine on the first computer device, create a first load balancing virtual machine on the first computer device, and establish a connection between the first load balancing virtual machine and the first virtual switch; and receive configuration information for creating a load balancing virtual machine on the third computer device, create a second load balancing virtual machine on the third computer device, and establish a connection between the second load balancing virtual machine and the second virtual switch;

the first virtual switch is configured to: receive a first service packet sent by a first virtual machine of the first computer device, and forward the first service packet only to the first load balancing virtual machine when load balancing processing needs to be performed on the first service packet; and the second virtual switch is configured to: receive a second service packet sent by a second virtual machine of the third computer device, and forward the second service packet only to the second load balancing virtual machine when load balancing processing needs to be performed on the second service packet.

With reference to the third aspect, in a first possible implementation of the third aspect of the embodiments of the present application, that the first virtual switch forwards the first service packet only to the first load balancing virtual machine includes:

the first virtual switch sends a MAC address of the first load balancing virtual machine to the first virtual machine, so that the first virtual machine sends the service packet based on the obtained MAC address of the first load balancing virtual machine, and the first virtual switch forwards the service packet to the first load balancing virtual machine; or the first load balancing virtual machine sends a MAC address of the first load balancing virtual machine to the first virtual machine, so that the first virtual machine sends the service packet based on the MAC address of the first load balancing virtual machine, and the first virtual switch forwards the service packet to the first load balancing virtual machine; or the first virtual machine sends the service packet based on a pre-configured MAC address of the first load balancing virtual machine, and the first virtual switch forwards the service packet to the first load balancing virtual machine.

With reference to the first possible implementation of the third aspect, in a second possible implementation of the third aspect of the embodiments of the present application, that the first virtual switch sends a MAC address of the first load balancing virtual machine to the first virtual machine includes:

the first virtual switch receives a control packet sent by the first virtual machine, and returns a control response packet to the first virtual machine, where the control response packet includes the MAC address of the first load balancing virtual machine. That is, a virtual machine management unit may configure a forwarding mode of the first virtual switch. The first virtual switch performs directional processing on the service packet of the first virtual machine according to the configured forwarding mode, so that the first virtual switch forwards the service packet to the first load balancing virtual machine.

With reference to the second possible implementation of the third aspect, in a third possible implementation of the third aspect of the embodiments of the present application, the control packet is an Address Resolution Protocol (ARP) packet or an Internet Control Message Protocol (ICMP) packet. For example, the control packet may be an Address Resolution Protocol (ARP) packet, the forwarding mode may be an ARP cache mode, and the first virtual machine may send the MAC address of the first load balancing virtual machine to the first virtual machine in the ARP cache mode. Optionally, when the control packet is an ICMP packet, the forwarding mode may be a Neighbor Discovery Protocol (NDP) cache mode.

With reference to any one of the third aspect, or the first to the third possible implementations of the third aspect, in a fourth possible implementation of the third aspect of the embodiments of the present application, the first computer device further includes a second virtual machine, and the second virtual machine has a capability of processing the service packet of the first virtual machine, where when the first load balancing virtual machine determines, in a load balancing manner, that the second virtual machine processes the service packet of the first virtual machine, the second virtual machine receives the service packet forwarded by the first load balancing virtual machine, and sends a result of processing the service packet to the first load balancing virtual machine; and the first load balancing virtual machine is further configured to send, to the first virtual machine by using the first virtual switch, the result of processing the service packet by the second virtual machine.

With reference to any one of the third aspect, or the first to the fourth possible implementations of the third aspect, in a fifth possible implementation of the third aspect of the embodiments of the present application, an IP address of the first load balancing virtual machine is the same as an IP address of the second load balancing virtual machine, or the MAC address of the first load balancing virtual machine is the same as a MAC address of the second load balancing virtual machine.

A fourth aspect of the embodiments of the present application provides a load balancing method, including:

receiving, by a second computer device, configuration information for creating a load balancing virtual machine on a first computer device, where the first computer device includes a central processing unit (CPU), a memory, and a storage device, and the first computer device further includes a first virtual machine and a virtual switch;

creating, by the second computer device, the load balancing virtual machine on the first computer device according to the configuration information, and establishing a connection between the load balancing virtual machine and the virtual switch of the first computer device;

receiving, by the virtual switch, a service packet sent by the first virtual machine, and forwarding the service packet only to the load balancing virtual machine when load balancing processing needs to be performed on the service packet; and receiving, by the load balancing virtual machine, the service packet forwarded by the first virtual switch, and forwarding the service packet in a load balancing manner.

The forwarding, by the load balancing virtual machine, the service packet in a load balancing manner may be as follows: After receiving the service packet, the load balancing virtual machine first determines whether a back-end server has been allocated to the service packet to serve the service packet, and if the back-end server has been allocated, sends the service packet to the back-end server that has been allocated. If the back-end server has not yet been allocated, a back-end server is selected by using a load balancing algorithm, to serve the service packet. The load balancing algorithm includes but is not limited to round robin, weighted round robin, a random algorithm, least connections, source address hash, or location-based weighted round robin. In the location-based weighted round robin manner, a back-end server of a computer device on which a virtual machine that initiates a service packet is located may be preferentially selected. In this way, a speed of processing the service packet by the back-end server can be increased, and network bandwidth can be saved.

With reference to the fourth aspect, in a first possible implementation of the fourth aspect of the embodiments of the present application, the forwarding, by the virtual switch, the service packet only to the load balancing virtual machine includes:

sending, by the virtual switch, a MAC address of the load balancing virtual machine to the first virtual machine, so that the first virtual machine sends the service packet based on the obtained MAC address of the load balancing virtual machine, and forwarding, by the virtual switch, the service packet to the load balancing virtual machine; or sending, by the load balancing virtual machine, a MAC address of the load balancing virtual machine to the first virtual machine, so that the first virtual machine sends the service packet based on the obtained MAC address of the load balancing virtual machine, and forwarding, by the virtual switch, the service packet to the load balancing virtual machine; or sending, by the first virtual machine, the service packet based on a pre-configured MAC address of the load balancing virtual machine, and forwarding, by the virtual switch, the service packet to the load balancing virtual machine.

With reference to the first possible implementation of the fourth aspect, in a second possible implementation of the fourth aspect of the embodiments of the present application, the sending, by the virtual switch, a MAC address of the load balancing virtual machine to the first virtual machine includes:

receiving, by the virtual switch, a control packet sent by the first virtual machine, and returning a control response packet to the first virtual machine, where the control response packet includes the MAC address of the load balancing virtual machine. That is, a forwarding mode of the virtual switch may be configured. The virtual switch performs directional processing on the service packet of the first virtual machine according to the configured forwarding mode, so that the virtual switch forwards the service packet to the load balancing virtual machine.

With reference to the second possible implementation of the fourth aspect, in a third possible implementation of the fourth aspect of the embodiments of the present application, the control packet is an Address Resolution Protocol (ARP) packet or an Internet Control Message Protocol (ICMP) packet. For example, the control packet may be an Address Resolution Protocol (ARP) packet, the forwarding mode may be an ARP cache mode, and the first virtual machine may send the MAC address of the first load balancing virtual machine to the first virtual machine in the ARP cache mode. Optionally, when the control packet is an ICMP packet, the forwarding mode may be a Neighbor Discovery Protocol (NDP) cache mode.

With reference to any one of the fourth aspect, or the first to the third possible implementations of the fourth aspect, in a fourth possible implementation of the fourth aspect of the embodiments of the present application, before the creating, by the second computer device, the load balancing virtual machine on the first computer device according to the configuration information, the method further includes:

sending, by the second computer device, the configuration information to the first computer device; and receiving, by the first computer device, the configuration information for creating a load balancing virtual machine, and instructing the second computer device to create the load balancing virtual machine. Optionally, the second computer device may create the load balancing virtual machine on the second computer device directly according to the configuration information.

The configuration information for creating a load balancing virtual machine is delivered by a user by using a cloud management platform (the second computer device). The configuration information includes but is not limited to an identifier of the load balancing virtual machine, an IP address of the load balancing virtual machine, and information about a back-end server related to the load balancing virtual machine. The information about the back-end server includes but is not limited to an identifier of the back-end server, an Internet Protocol (IP) address of the back-end server, or a health check method of the back-end server. The health check method of the back-end server refers to a method in which the load balancing virtual machine checks a health status of the back-end server. The back-end server is a server that provides a specific service. The load balancing virtual machine selects, according to a received service packet in a load balancing manner, for example, by using a load balancing algorithm, one server from back-end servers as a server that processes the service packet. In the embodiments of the present application, the back-end server may be a virtual machine, or may be a specific physical server.

With reference to any one of the fourth aspect, or the first to the fourth possible implementations of the fourth aspect, in a fifth possible implementation of the fourth aspect of the embodiments of the present application, the second computer device further includes a second virtual machine, the second virtual machine has a capability of processing the service packet of the first virtual machine, and the method further includes:

when the load balancing virtual machine determines, by using a load balancing algorithm, that the second virtual machine processes the service packet of the first virtual machine, receiving, by the second virtual machine, the service packet forwarded by the load balancing virtual machine, and sending a result of processing the service packet to the load balancing virtual machine; and sending, by the load balancing virtual machine to the first virtual machine by using the virtual switch, the result of processing the service packet by the second virtual machine.

According to the computer device, the system, and the load balancing method provided in the embodiments of the present application, a load balancing virtual machine is created on each computer device, and when load balancing processing needs to be performed on a service of a virtual machine of the computer device, a related service packet is sent only to the load balancing virtual machine of the computer device so as to perform load balancing processing. Because load balancing of the related service packet is implemented in the computer device, there is no such a case in which all service packets on multiple computer devices are processed by one load balancing node, thereby avoiding a processing delay caused by congestion of centralized load balancing. In addition, when a computer device is faulty, a virtual machine of the computer device goes offline accordingly, and a load balancing requirement is not generated any more. Therefore, when a fault of a single computer device causes a fault of a load balancing virtual machine, a load balancing virtual machine of another computer device is not affected, and there is no service interruption that is caused by active/standby switchover because of the fault of the load balancing virtual machine either.

BRIEF DESCRIPTION OF DRAWINGS

The following briefly describes the accompanying drawings used in describing the embodiments or the prior art.

DESCRIPTION OF EMBODIMENTS

The following describes the technical solutions in the embodiments of the present application with reference to the accompanying drawings.

Figure 1:
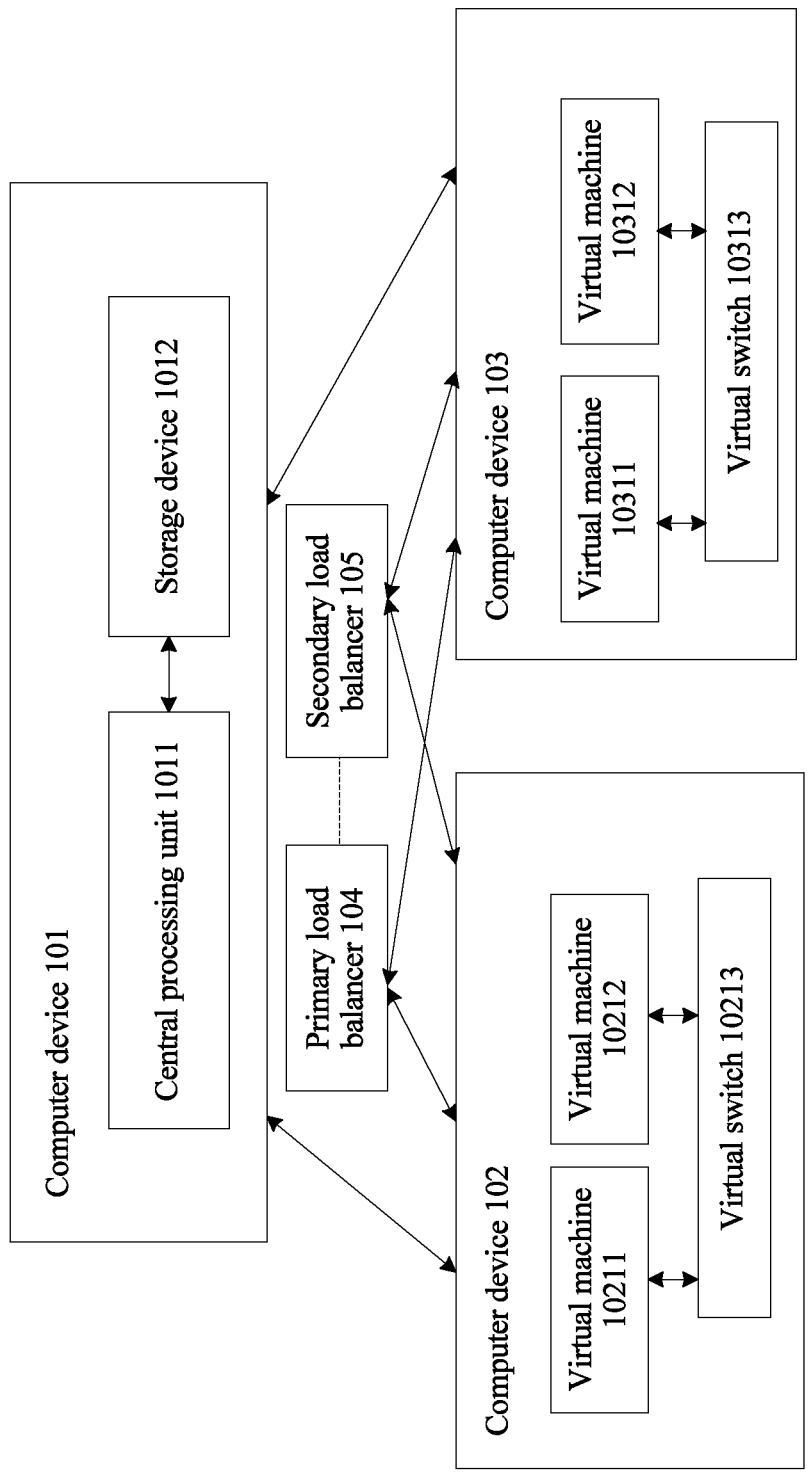
FIG. 1 is a schematic diagram of a load balancing architecture.

FIG. 1 is a schematic diagram of a load balancing architecture in the conventional art. In FIG. 1, a computer device 101, a computer device 102, a computer device 103, a primary virtual load balancer 104, and a secondary virtual load balancer 105 are included. The computer device 101 is used as a cloud management platform, and includes components such as a central processing unit (CPU) 1011 and a storage device 1012 (such as a hard disk or a solid-state drive). A program related to the cloud management platform runs on the computer device 101 to implement management and configuration on nodes such as the computer device 102 and the computer device 103. The computer device 102 and the computer device 103 are connected by using a network. The computer device 101 may create a corresponding virtual machine on the computer device 102 or the computer device 103 according to received configuration information related to creation of the virtual machine.

In FIG. 1, an example in which each computer device includes two virtual machines is used for description. For example, the computer device 102 includes a virtual machine 10211 and a virtual machine 10212, and the computer device 103 includes a virtual machine 10311 and a virtual machine 10312. The primary load balancer 104 and the secondary load balancer 105 provide, in an active/standby manner, a load balancing service to a virtual machine of the computer device 102 or the computer device 103. The primary load balancer 104 and the secondary load balancer 105 are connected in a heartbeat detection manner. When the primary load balancer 104 is faulty, the secondary load balancer 105 continues providing a load balancing service to the virtual machine in succession to the primary load balancer 104.

In this load balancing manner, when the primary load balancing node 104 is faulty, and switching to the secondary load balancing node needs to be performed, no load balancer provides a load balancing service during the switching. Consequently, a service packet on which load balancing processing needs to be performed cannot be processed. In addition, only one load balancer (the load balancer 104 or 105) processes service packets of all virtual machines. This is prone to cause overload and congestion on the virtual load balancer, thereby affecting timely processing of a requested service, and reducing user experience.

To avoid interruption caused during switching when the active/standby manner is used for virtual load balancing and congestion caused when all service packets are processed by one virtual load balancing node, the embodiments of the present application provide a virtual load balancing method, device, and system. A distributed load balancing virtual machine is created, and load balancing functions are offloaded to each node device without a centralized load balancing mode in which active/standby switchover is performed, so as to avoid interruption caused during active/standby switchover and congestion caused by centralized load balancing.

In embodiments of the present application, a network including one cloud management platform and two computer device nodes is used as an example for description. Shown in FIG. 2A and continued in FIG. 2B is a schematic diagram of a virtual load balancing architecture according to an embodiment of the present application. A computer device 201 is used as a cloud management platform to implement virtual management and configuration on a computer device 202 and a computer device 203. It should be noted that in FIG. 2A and FIG. 2B, two computer devices are used as an example to describe the solution of this embodiment of the present application. In a specific implementation, the computer device 201, that is used as the cloud management platform, may configure and manage at least two computer devices. A specific quantity of computer devices is not limited.

Components of a computer device in this embodiment of the present application are described by using the computer device 202 in FIG. 2B as an example. The computer device 202 may include a hardware resource layer 2023 that includes computing hardware 20231, storage hardware 20232, and network hardware 20233. The computing hardware 20231 may be a special-purpose processor or a general-purpose processor providing processing functions and computing functions. The storage hardware 20232 provides a storage capability, and the storage capability may be provided by the storage hardware 20232 (such as a local memory or a local hard disk of a server), or may be provided by using a network (for example, a server is connected to a network storage device by using a network). The network hardware 20233 may be a switching device (such as a network interface card), a router, and/or another network device, and the network hardware 20233 implements communication between multiple devices. The multiple devices are connected in a wireless or wired manner. A virtualization layer of the computer device 202 is used to abstract hardware resources at the hardware resource layer, so as to provide virtual resources. An operating system 2022 of the computer device 202 includes, and is not limited to, a virtualization layer hypervisor 20221 used for virtualization management and a virtual switch 20222. The virtualization layer hypervisor 20221 manages virtual machines (such as a virtual machine 20213) of the computer device 202. The virtual switch 20222 provides a network connection function between the virtual machines managed by the hypervisor 20221, and provides a network connection function between a virtual machine and a physical network. A virtual load balancing proxy unit 20211 performs configuration and management on a load balancing virtual machine 20212 of the computer device 202 by using the virtualization layer hypervisor 20221.

The computer device 201 is used as the cloud management platform. A program related to the cloud management platform runs on the computer device 201 to implement management and configuration on the computer device 202 and the computer device 203, and the management and the configuration include management and configuration on virtual machines of the computer device 202 and the computer device 203. The computer device 202 and the computer device 203 are used as device nodes under control of the cloud management platform, and provide a service related to a virtual machine and the like.

Figure 2A:
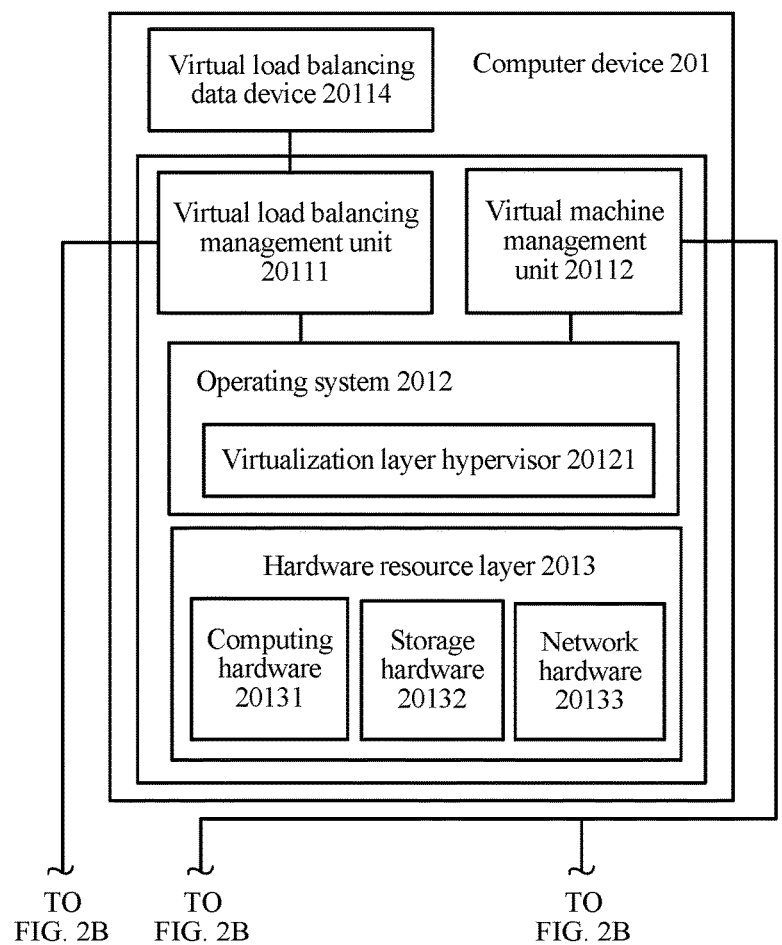
FIG. 2A and FIG. 2B are a schematic diagram of a virtual load balancing architecture according to an embodiment of the present application.
Figure 2B:
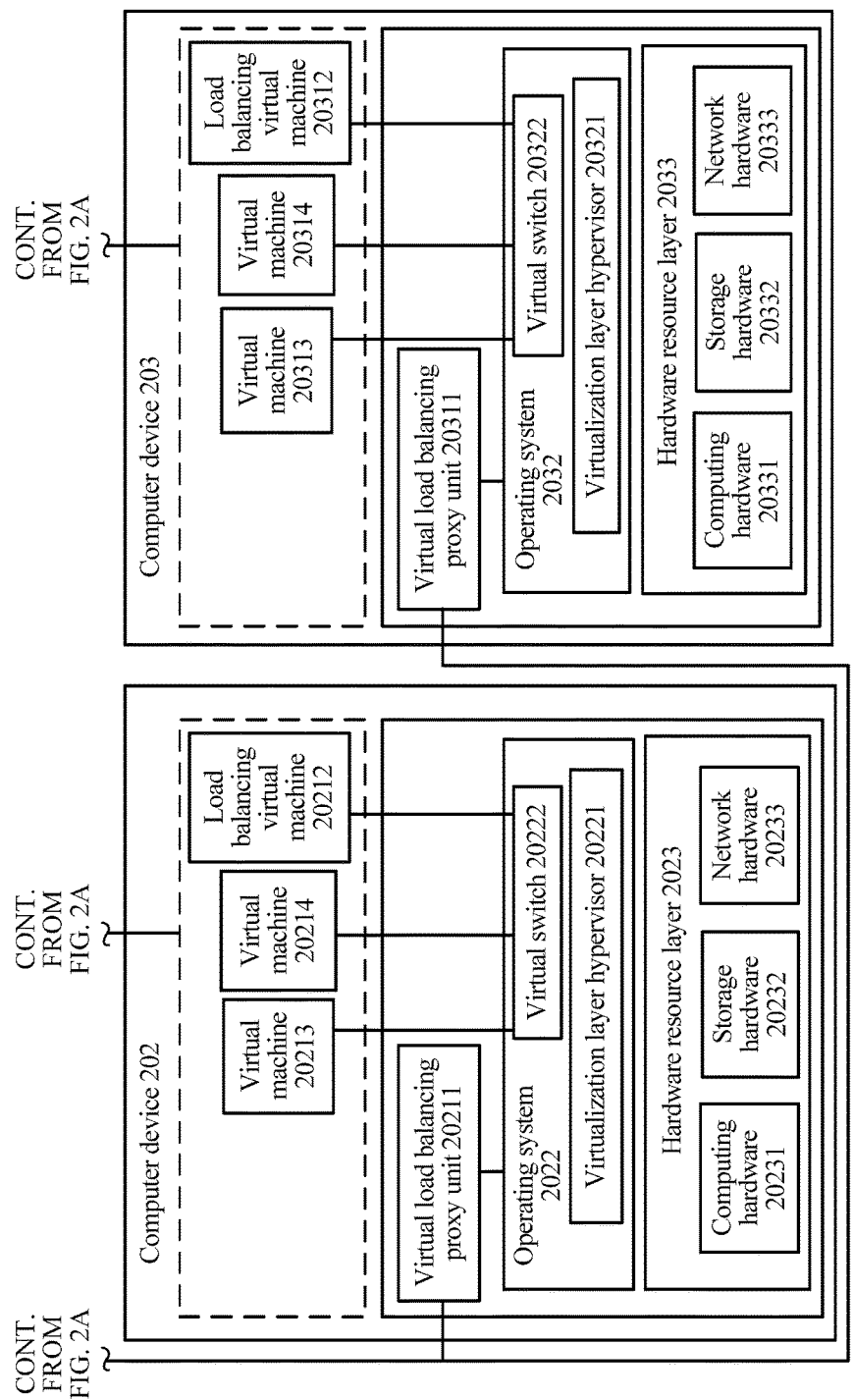

In FIG. 2A, the computer device 201 includes a hardware resource layer 2013 that includes computing hardware 20131, storage hardware 20132, and network hardware 20133. The computing hardware 20131 may be a special-purpose processor or a general-purpose processor providing processing functions and computing functions. The storage hardware 20132 provides a storage capability, and the storage capability may be provided by the storage hardware 20132 (such as a local memory or a local hard disk of a server), or may be provided by using a network (for example, a server is connected to a network storage device by using a network). The network hardware 20133 may be a switching device (such as a network interface card), a router, and/or another network device, and the network hardware 20133 is configured to implement communication between multiple devices. The multiple devices are connected in a wireless or wired manner. A virtualization layer of the computer device 201 is used to abstract hardware resources at the hardware resource layer, so as to provide virtual resources. An operating system 2012 of the computer device 201 includes, and is not limited to, a virtualization layer hypervisor 20121 used for virtualization management.

For example, when a user applies for a virtual machine of the computer device 202 by using the cloud management platform, load balancing processing needs to be performed on a service packet of the virtual machine that is applied for. The following describes a load balancing manner provided in this embodiment of the present application.

In this embodiment of the present application, load balancing processing may be performed, by using a load balancer, on the service packet of the virtual machine that is applied for, that is, load balancing processing may be performed, by creating a load balancer, on the service packet of the virtual machine that is applied for. The load balancer includes but is not limited to implementations such as a virtual machine, a namespace, and a container. In this embodiment of the present application, an example in which a virtual machine is used as the load balancer is used for description. It may be understood that, for an implementation in which a namespace or a container is used as the load balancer, refer to the implementation in which a virtual machine is used as the load balancer.

In this embodiment of the present application, the cloud management platform implements unified scheduling and management on resources such as a network, storage, and computing. Based on the unified scheduling and management, the cloud management platform implements service automation and orchestration, implements operational functions such as accounting, a procedure, logging, and application delivery, and provides available, convenient, desired network access for a user and an administrator in a "pay as you use" manner. The user and the administrator can access a configurable computing resource shared pool (resources include a network, a server, storage, application software, a service, and the like).

Referring to FIG. 2A, the computer device 201 that is used as the cloud management platform includes a virtual load balancing management unit 20111 and a virtual machine management unit 20112.

The virtual load balancing management unit 20111 is configured to: receive configuration information for creating a load balancing virtual machine, and store the configuration information for creating a load balancing virtual machine in a virtual load balancing data device 20114. The virtual load balancing management unit 20111 may further send the configuration information for creating a load balancing virtual machine to the virtual load balancing proxy unit 20211.

The virtual machine management unit 20112 is configured to create or delete the load balancing virtual machine 20212 according to the configuration information for creating a load balancing virtual machine.

The configuration information for creating a load balancing virtual machine is delivered by a user by using the cloud management platform. The configuration information includes but is not limited to an identifier of the load balancing virtual machine, an IP address of the load balancing virtual machine such as a virtual IP (VIP) address, and information about a back-end server related to the load balancing virtual machine. The VIP address of the load balancing virtual machine is an IP address of the load balancing virtual machine. The information about the back-end server includes but is not limited to an identifier of the back-end server, an Internet Protocol (IP) address of the back-end server, or a health check method of the back-end server. The health check method of the back-end server refers to a method in which the load balancing virtual machine checks a health status of the back-end server. The back-end server is a server that provides a specific service. The load balancing virtual machine selects, according to a received service packet in a load balancing manner, for example, by using a load balancing algorithm, one server from back-end servers as a server that processes the service packet. In this embodiment of the present application, the back-end server may be a virtual machine, or may be a specific physical server.

In FIG. 2A, the virtual load balancing data device 20114 is configured to store the configuration information for creating a load balancing virtual machine, and may be a storage device of the computer device 201, or may be a storage device independent of the computer device 201. This embodiment of the present application imposes no limitation on a specific manner in which the configuration information for creating a load balancing virtual machine is stored.

The virtual machine management unit 20112 may create or delete the load balancing virtual machine 20212 directly according to an instruction of the virtual load balancing management unit 20111, or may create or delete the load balancing virtual machine 20212 according to an instruction of the virtual load balancing proxy unit 20211 of the computer device 202.

The virtual machine management unit 20112 is further configured to create a corresponding virtual machine according to configuration information for creating a virtual machine on the computer device 202 that is delivered by the user. For example, when the computer device 201 receives configuration information for creating a virtual machine on the computer device 202 that is delivered by the user, the virtual machine management unit 20112 creates the virtual machine 20213 on the computer device 202. Likewise, when the computer device 201 receives configuration information that is delivered by the user and that is for creating, on the computer device 202, a virtual machine that is used as a back-end server, the virtual machine management unit 20112 creates the corresponding virtual machine that is used as the back-end server, for example, creates a virtual machine 20214.

In an optional implementation, the computer device 202 may further include the virtual load balancing proxy unit 20211. The virtual load balancing proxy unit 20211 is configured to: obtain the configuration information for creating a load balancing virtual machine from the virtual load balancing management unit 20111, and instruct the virtual machine management unit 20112 to create the load balancing virtual machine 20212 according to the configuration information for creating a load balancing virtual machine.

When instructing the virtual machine management unit 20112 to create the load balancing virtual machine 20212 according to the configuration information for creating a load balancing virtual machine, the virtual load balancing proxy unit 20211 sends notification information to the virtual machine management unit 20112. The notification information further includes virtual machine parameter information for creating the load balancing virtual machine 20212. The virtual machine parameter information of the load balancing virtual machine 20212 includes but is not limited to information such as a quantity of virtual central processing units, a size of a virtual memory, and a logical network on which the load balancing virtual machine 20212 is located.

A process in which the virtual machine management unit 20112 creates the load balancing virtual machine 20212 may be as follows: The virtual machine management unit 20112 creates the load balancing virtual machine 20212 by calling an application programming interface (API) for creating a virtual machine, and specifying a mirror that has a load balancing module. When the API is called to create a virtual machine, virtual machine parameter information is used, so as to create the virtual machine according to the virtual machine parameter information. The mirror that has the load balancing module is specified, so that the created virtual machine has a load balancing module, and the configuration information is sent to the load balancing module of the virtual machine.

When the virtual load balancing management unit 20111 directly instructs the virtual machine management unit 20112 to create the load balancing virtual machine 20212, the virtual load balancing management unit 20111 sends a notification message to the virtual machine management unit 20112. The notification message instructs the virtual machine management unit 20112 to start creation of the load balancing virtual machine 20212. The notification message includes the configuration information and the virtual machine parameter information that are used for creating the load balancing virtual machine 20212. After the load balancing virtual machine 20212 has been created on the computer device 202, the load balancing virtual machine 20212 receives a service packet that is sent by a virtual machine such as the virtual machine 20213 of the computer device 202 by using the virtual switch 20222, and process the received service packet in a load balancing manner.

That the load balancing virtual machine 20212 processes the service packet of the virtual machine of the computer device 202 in a load balancing manner. After receiving the service packet, the load balancing virtual machine 20212 first determines whether a back-end server has been allocated to the service packet to serve the service packet, and if the back-end server has been allocated, sends the service packet to the back-end server that has been allocated. If the back-end server has not yet been allocated, a back-end server is selected by using a load balancing algorithm, to serve the service packet. The load balancing algorithm includes but is not limited to round robin, weighted round robin, a random algorithm, least connections, source address hash, or location-based weighted round robin. In the location-based weighted round robin manner, a back-end server of a computer device, on which a virtual machine that initiates a service packet is located, may be preferentially selected. In this way, speed of processing the service packet by the back-end server can be increased, and network bandwidth can be saved.

In this embodiment of the present application, the round robin algorithm is used as an example to describe a manner in which a back-end server is selected for the load balancing virtual machine 20212. When the back-end server of the load balancing virtual machine 20212 includes the virtual machine 20214 and a virtual machine 20314, the load balancing virtual machine 20212 groups all the back-end servers (the virtual machine 20214 and the virtual machine 20314) into a list, and allocates, in turn in the list, service packets that need to be processed. When the load balancing virtual machine 20212 receives the first service packet sent by the virtual machine 20213, the virtual machine 20214 is used as a back-end server that provides a service, and the first service packet is sent to the virtual machine 20214. When the second service packet from the virtual machine 20213 is received, the virtual machine 20314 is used as a back-end server that provides a service, and the second service packet is sent to the virtual machine 20314. When the load balancing virtual machine 20212 receives the third service packet sent by the virtual machine 20213, the virtual machine 20214 is used as a back-end server that provides a service, and the third service packet is sent to the virtual machine 20214. The foregoing operations are circularly repeated.

The load balancing manner is described by using an example in which the user applies, by using the cloud management platform, for a virtual machine that is of the computer device 202 and that initiates a service, and load balancing processing needs to be performed on a service request of the virtual machine that is applied for. When the user applies, by using the cloud management platform, for a virtual machine that is of the computer device 203 and that initiates a service, and load balancing processing needs to be performed on a service request of the virtual machine that is applied for, an implementation of this is similar to that described above. Because load balancing units are distributed on all computer devices, a centralized load balancing node does not exist, load balancing processing is implemented in each computer device on a service packet related to load balancing, and a processing delay caused by congestion of service packets does not occur. In addition, load balancers are deployed on both the computer device 202 and the computer device 203. When a computer device is faulty, a virtual machine of the computing device goes offline accordingly, and a load balancing requirement is not generated any more. Therefore, when a fault of a single computer device causes a fault of a load balancing unit, processing of another load balancing service is not affected, and there is no service interruption that is caused by active/standby switchover because of the fault of the load balancing node either.

In this embodiment of the present application, the configuration information of the load balancing virtual machine 20212 that is obtained by the virtual load balancing proxy unit 20211 from the virtual load balancing management unit 20111 may further include network information of the load balancing virtual machine 20212. The virtual load balancing proxy unit 20211 further instructs, according to the network information in the configuration information for creating a load balancing virtual machine, the virtual machine management unit 20112 to create a virtual network interface card for the load balancing virtual machine 20212. Further, the virtual load balancing proxy unit 20211, instructs the virtual machine management unit 20112 to establish a connection between the virtual network interface card and the virtual switch 20222. When creating the virtual network interface card according to the instruction of the virtual load balancing proxy unit 20211, the virtual machine management unit 20112 may further assign an IP address and a MAC address to the created virtual network interface card according to the configuration information for creating a load balancing virtual machine. Optionally, the virtual load balancing management unit 20111 may instruct the virtual machine management unit 20112 to create a virtual network interface card for the load balancing virtual machine 20212 and to establish a connection between the virtual network interface card and the virtual switch 20222.

The connection between the virtual network interface card and the virtual switch 20222 may be established by configuring a network identifier of the virtual switch. The network identifier of the virtual switch is an identifier of a network interface of the virtual switch, and a connection can be established between a virtual machine and the virtual switch only when an identifier of a network interface of the virtual machine is the same as that of the network interface of the virtual switch. In this embodiment of the present application, the virtual machine management unit 20112 establishes the connection between the load balancing virtual machine 20212 and the virtual switch 20222 by configuring the network identifier of the virtual switch 20222. For example, the virtual switch 20222 has three network interfaces whose network identifiers are 100. When virtual network interface cards of the load balancing virtual machine 20212 and the virtual machine 20213 have interfaces whose network identifiers are 100, the virtual machine 20213 may communicate by using an interface whose network identifier is 100 and an interface that is of the load balancing virtual machine 20212 and whose network identifier is 100. The virtual machine management unit 20112 may configure a network identifier for the virtual switch 20222 according to an instruction of the virtual load balancing proxy unit 20211 or the virtual load balancing management unit 20111. It may be understood that, the three network interfaces of the virtual switch 20222 are only an example. During specific implementation, the virtual switch 20222 may also include another network interface. For example, the virtual switch 20222 includes 100 network interfaces, and network identifiers of three of the network interfaces are 100.

After the virtual machine management unit 20112 establishes the connection between the virtual network interface card and the virtual switch 20222 according to the instruction of the virtual load balancing proxy unit 20211, the virtual load balancing proxy unit 20211 further instructs the virtual machine management unit 20112 to configure a forwarding mode of the virtual switch 20222. The virtual switch 20222 performs directional forwarding processing on the service packet of the virtual machine 20213, so that the virtual machine 20213 sends the service packet to the load balancing virtual machine 20212. Optionally, the virtual load balancing management unit 20111 may instruct the virtual machine management unit 20112 to configure a forwarding mode of the virtual switch 20222.

The forwarding mode of the virtual switch 20222 may be an Address Resolution Protocol (ARP) cache mode or a Neighbor Discovery Protocol (NDP) cache mode, that is, a manner in which the virtual switch 20222 performs directional forwarding processing on the service packet is the ARP or NDP cache mode. In this embodiment of the present application, an implementation of an ARP cache technology is described by using, as an example, a cloud platform that supports OpenStack.

The ARP cache technology is implemented by using a flow table. A flow table technology usually includes two parts: a matching condition and actions. The matching condition of the ARP cache flow table is as follows: A protocol type is ARP, an ARP destination protocol address is a virtual IP address (VIP), the VIP is an IP address that can be accessed by a load balancing virtual machine, and an ARP operation type is an ARP request. The actions include the following: 1. A destination Media Access Control (MAC) address of a received ARP packet is changed to a source MAC address of the packet. 2. The source MAC address of the received ARP packet is changed to a MAC address of the load balancing virtual machine 20212. 3. An ARP operation type of the received ARP packet is changed to an ARP reply. 4. An ARP destination protocol address of the received ARP packet is changed to an ARP source protocol address of the ARP packet, and the protocol address is a term in the ARP protocol and refers to an IP address. 5. The ARP source protocol address of the received ARP packet is changed to an IP address of the load balancing virtual machine 20212. 6. An ARP destination hardware address of the received ARP packet is changed to an ARP source hardware address of the packet, and the hardware address is a term in the ARP protocol and refers to a MAC address. 7. The ARP source hardware address of the received ARP packet is changed to the MAC address of the load balancing virtual machine 20212. Not all the actions in the flow table are necessarily performed, and persons skilled in the art may learn that the action 2 is necessary. Then, the changed ARP packet is delivered to the virtual switch 20222 and is sent to the virtual machine 20213 by using the virtual switch 20222. In the ARP cache mode of the virtual switch 20222, the virtual machine 20213 can obtain a MAC address corresponding to a VIP, and send a service packet based on the obtained MAC address. Therefore, a service packet that is sent by a virtual machine of the computer device 202 and on which load balancing processing needs to be performed is sent only to the load balancing virtual machine 20212 of the computer device 202.

After the virtual switch 20222 sends an ARP reply packet to the virtual machine 20213, the virtual machine 20213 constructs a service request packet. In the service request packet, an IP address of the service request packet is a VIP address, and a MAC address of the service request packet is the MAC address of the load balancing virtual machine 20212 that is obtained from the ARP reply of the virtual switch 20222. The virtual machine 20213 sends the constructed service request packet to the virtual switch 20222, and the virtual switch 20222 sends the service request packet to the load balancing virtual machine 20212 according to the IP address and the MAC address of the service request packet.

An IP address of a packet that is sent by the virtual machine 20213 and on which load balancing processing does not need to be performed is not a VIP address, and the virtual switch 20222 may forward the packet in a general forwarding mode.

When load balancing processing needs to be performed on a service packet that is received by the virtual switch 20222 and that is initiated by the virtual machine 20213, the virtual switch 20222 sends the service packet of the virtual machine 20213 to the load balancing virtual machine 20212 by using the ARP cache technology. A load balancing virtual machine (such as a load balancing virtual machine 20312) of another computer device (such as the computer device 203) does not receive an ARP request, and does not receive the service packet that is sent by the virtual machine 20213 of the computer device 202. Therefore, the following objective is achieved: When load balancing processing needs to be performed on a service packet of a virtual machine of each computer device, the service packet is implemented only on a load balancing virtual machine of the computer device.

Similar to the creation of the load balancing virtual machine 20212 on the computer device 202, the load balancing virtual machine 20312 may be created on the computer device 203. A service packet that is sent by a virtual machine of each computer device and on which load balancing processing needs to be performed is forwarded only to a load balancing virtual machine created on the computer device, and is not forwarded to a load balancing virtual machine of another computer device for processing. Because of that, the IP address of the load balancing virtual machine 20212 of the computer device 202 may be the same as an IP address of the load balancing virtual machine 20312 of the computer device 203. Likewise, the MAC address of the load balancing virtual machine 20212 of the computer device 202 may be the same as a MAC address of the load balancing virtual machine 20312 of the computer device 203. In this way, IP address resources and/or MAC address resources in a network that includes computer devices can be saved.

In this embodiment of the present application, when the user who deploys the load balancing service creates the first virtual machine on the computer device 202, the virtual load balancing proxy unit 20211 may instruct the virtual machine management unit 20112 to create the load balancing virtual machine 20212. In this way, resources in the computer device 202 can be saved, and hardware resource waste that is caused by creation of a load balancing virtual machine when a load balancing service is not required can be avoided. An occasion on which the user who deploys the load balancing service creates the first virtual machine on the computer device 202 may be determined as follows: When the virtual machine management unit 20112 creates a virtual machine (such as the virtual machine 20213), the virtual load balancing management unit 20111 determines whether the created virtual machine is the first virtual machine that is configured by the user who has configured the virtual load balancing service. If the created virtual machine is the first virtual machine that is configured by the user who has configured the virtual load balancing service, the virtual load balancing management unit 20111 instructs the virtual load balancing proxy unit to instruct the virtual machine management unit 20112 to create the load balancing virtual machine 20212. Alternatively, the virtual load balancing management unit 20111 may directly instruct the virtual machine management unit 20112 to create the load balancing virtual machine 20212. When a last virtual machine configured by the user who has configured the virtual load balancing service is deleted, the virtual load balancing management unit 20111 instructs the virtual load balancing proxy unit to instruct the virtual machine management unit 20112 to delete the load balancing virtual machine 20212, or directly instructs the virtual machine management unit 20112 to delete the load balancing virtual machine 20212.

When creating the first virtual machine, the user who has configured the virtual load balancing service creates the load balancing virtual machine 20212, and when the last virtual machine configured by the same user is deleted, the load balancing virtual machine 20212 is deleted, so that virtual resources in the computer device 202 can be reduced, and resource utilization of the computer device 202 can be increased.

The virtual load balancing proxy unit 20211 of the computer device 202 instructs the virtual machine management unit 20112 of the computer device 201 to create and configure the load balancing virtual machine 20212. During specific implementation, the computer device 202 may not include the virtual load balancing proxy unit 20211. When receiving the configuration information for creating the load balancing virtual machine 20212, the virtual load balancing management unit 20111 of the computer device 201 may directly instruct the virtual machine management unit 20112 to create the load balancing virtual machine 20212. This embodiment of the present application imposes no limitation on a specific manner of creating the load balancing virtual machine 20212.

A user applies for the virtual machine 20213 by using the cloud management platform, and accesses a video service by using the virtual machine 20213. A load balancing manner in this embodiment of the present application is described by using an example in which the video service may be provided by a back-end server such as the virtual machine 20214 or the virtual machine 20314. With reference to the embodiment shown in FIG. 2A and FIG. 2B, the cloud management platform (the computer device 201) separately creates the load balancing virtual machine 20212 on the computer device 202, and creates the load balancing virtual machine 20312 on the computer device 203. When the virtual machine 20213 initiates a service packet for accessing a video service, the service packet is forwarded by the virtual switch 20222 only to the load balancing virtual machine 20212 of the computer device 202, and the load balancing virtual machine 20312 of the computer device 203 that is connected to the computer device 202 by using a network does not receive the service packet sent by the virtual machine 20213, so that load balancing processing is implemented only in the computer device 202 on a service packet that is initiated in the computer device 202 and on which load balancing processing needs to be performed. After receiving the service packet that is related to the video service, that is of the virtual machine 20213, and that is forwarded by the virtual switch 20222, the load balancing virtual machine 20212 processes the service packet by using a load balancing algorithm. One of the virtual machine 20214 or the virtual machine 20314 may be selected as a back-end server to provide the video service to the virtual machine 20213. Preferably, the load balancing virtual machine 20212 may select the virtual machine 20214 as a back-end server to provide the video service to the virtual machine 20213. In this way, network bandwidth can be saved, and efficiency of responding to a service packet by a back-end server can be improved.

Figure 3:
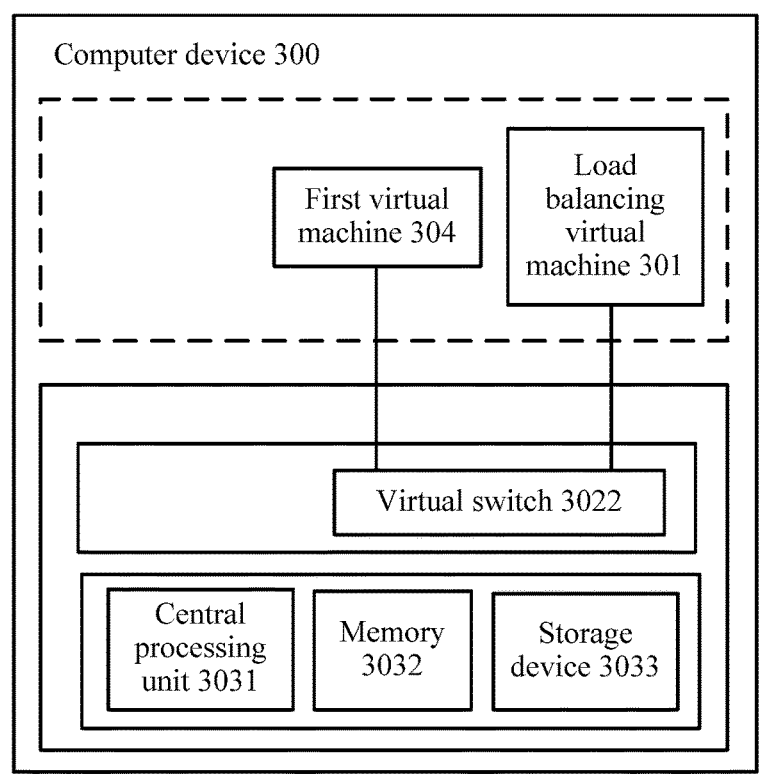
FIG. 3 is a schematic structural diagram of a computer device according to an embodiment of the present application.

Referring to FIG. 3, FIG. 3 is a schematic structural diagram of a computer device 300 according to an embodiment of the present application. In FIG. 3, the computer device 300 includes a central processing unit (CPU) 3031, a memory 3032, and a storage device 3033, and further includes a first virtual machine 304, a load balancing virtual machine 301, and a virtual switch 3022 that are generated after virtualization that is based on hardware of the computer device 300. The first virtual machine 304 and the load balancing virtual machine 301 are virtual machines that are created on the computer device 300.

The first virtual machine 304 is configured to send a service packet.

The virtual switch 3022 is configured to: receive the service packet sent by the first virtual machine 304, and forward the service packet only to the load balancing virtual machine 301 when load balancing processing needs to be performed on the service packet.

The load balancing virtual machine 301 is configured to: receive the service packet forwarded by the virtual switch 3022, and forward the service packet in a load balancing manner.

The computer device 300 includes the load balancing virtual machine 301. When load balancing processing needs to be performed on a service initiated by a virtual machine of the computer device 300, a related service packet is sent only to the load balancing virtual machine 301 of the computer device 300 so as to perform load balancing processing. Because load balancing of the related service packet is implemented in the computer device, there is no such a case in which all service packets on multiple computer devices are processed by one load balancing node, thereby avoiding a processing delay caused by congestion of centralized load balancing. In addition, when the computer device 300 is faulty, the virtual machine of the computer device 300 goes offline accordingly, and a load balancing requirement is not generated any more. Therefore, when a fault of a single computer device causes a fault of a load balancing virtual machine, a load balancing virtual machine of another computer device is not affected, and there is no service interruption that is caused by active/standby switchover because of the fault of the load balancing virtual machine either.

In this embodiment of the present application, in addition to the central processing unit (CPU) 3031, the memory 3032, and the storage device 3033, the computer device 300 may include a hardware device such as network hardware (not shown in the figure). The network hardware may be a switching device (such as a network interface card), a router, and/or another network device, and is configured to implement communication between multiple devices. The multiple devices may be connected in a wireless or wired manner.

Optionally, that the virtual switch 3022 forwards the service packet only to the load balancing virtual machine 301 may include:

the virtual switch 3022 sends a MAC address of the load balancing virtual machine 301 to the first virtual machine 304, so that the first virtual machine 304 sends the service packet based on the obtained MAC address of the load balancing virtual machine 301, and the virtual switch 3022 forwards the service packet to the load balancing virtual machine 301; or the load balancing virtual machine 301 sends a MAC address of the load balancing virtual machine 301 to the first virtual machine 304, so that the first virtual machine 304 sends the service packet based on the obtained MAC address of the load balancing virtual machine 301, and the virtual switch 3022 forwards the service packet to the load balancing virtual machine 301; or the first virtual machine 304 sends the service packet based on a pre-configured MAC address of the load balancing virtual machine 301, and the virtual switch 3022 forwards the service packet to the load balancing virtual machine 301.

That the virtual switch 3022 sends the MAC address of the load balancing virtual machine 301 to the first virtual machine 304 may include:

the virtual switch 3022 receives a control packet sent by the first virtual machine 304, and returns a control response packet to the first virtual machine 304, where the control response packet includes the MAC address of the load balancing virtual machine 301.

The control packet may be an ARP packet or an Internet Control Message Protocol (ICMP) packet, and the ICMP packet may be an ICMP version 6 (ICMPv6) packet. For example, the computer device 300 uses the IPv4 protocol. When the first virtual machine 304 needs to send the service packet, the first virtual machine 304 first sends the ARP packet to the virtual switch 3022. The virtual switch 3022 performs ARP cache, and sends the MAC address of the load balancing virtual machine 301 to the first virtual machine 304. The first virtual machine 304 sends the service packet to the load balancing virtual machine 301 according to the obtained MAC address of the load balancing virtual machine 301, with reference to information such as an obtained IP address of the load balancing virtual machine 301, and by using the virtual switch 3022. In this manner, when load balancing processing needs to be performed on the service packet that is sent by the first virtual machine 304, the service packet is sent only to the load balancing virtual machine 301 of the computer device 300.

Figure 4:
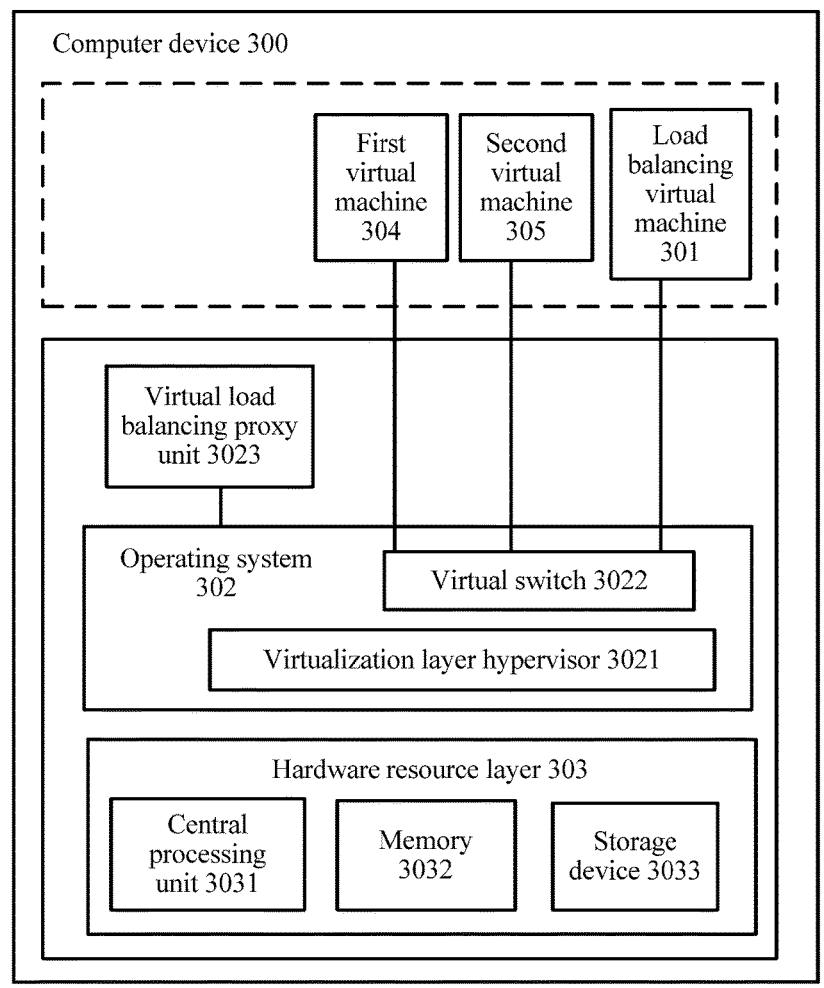
FIG. 4 is an entity diagram of a specific implementation structure of a computer device according to an embodiment of the present application.

Referring to FIG. 4, FIG. 4 is an entity diagram of a specific implementation structure of a computer device 300 according to an embodiment of the present application. In FIG. 4, a virtualization layer hypervisor 3021 used for virtualization management and the virtual switch 3022 run on an operating system 302 of the computer device 300. The virtualization layer hypervisor 3021 manages virtual machines (such as the first virtual machine 304) of the computer device 300. The virtual switch 3022 provides a network connection function between the virtual machines managed by the hypervisor 3021, and provides a network connection function between a virtual machine and a physical network. A virtual load balancing proxy unit 3023 performs configuration and management on the load balancing virtual machine 301 of the computer device 300 by using the virtualization layer hypervisor 3021.

The virtual load balancing proxy unit 3023 is configured to: receive configuration information for creating the load balancing virtual machine 301, control creation or deletion of the load balancing virtual machine 301, and control establishment of a connection between the load balancing virtual machine 301 and the virtual switch 3022.

The virtual load balancing proxy unit 3023 may start the creation of the load balancing virtual machine 301 when a user who creates the load balancing virtual machine 301 creates the first virtual machine (such as the first virtual machine 304) on the computer device 300. When a last virtual machine that is created on the computer device 300 by the user who creates the load balancing virtual machine 301 is deleted, the virtual load balancing proxy unit 3023 instructs to delete the load balancing virtual machine 301. In this way, resources in the computer device 300 can be saved, and hardware resource waste that is caused by creation of a load balancing virtual machine when a load balancing service is not required can be avoided. Specifically, the virtual load balancing proxy unit 3023 may be implemented with reference to the implementation of the virtual load balancing proxy unit 20211 in FIG. 2B. Details are not described again.

Optionally, the computer device 300 further includes a second virtual machine 305, and the second virtual machine 305 has a capability of processing the service packet of the first virtual machine 304.

When the load balancing virtual machine 301 determines, by using a load balancing algorithm, that the second virtual machine 305 processes the service packet of the first virtual machine 304, the second virtual machine 305 receives the service packet forwarded by the load balancing virtual machine 301, and sends a result of processing the service packet to the load balancing virtual machine 301.

The load balancing virtual machine 301 is further configured to send, to the first virtual machine 304 by using the virtual switch 3022, the result of processing the service packet by the second virtual machine 305. In an optional implementation, the second virtual machine 305 may directly send the result of processing the service packet to the first virtual machine 304, that is, the second virtual machine 305 sends the result of processing the service packet to the first virtual machine 304 without using the load balancing virtual machine 301.

The load balancing virtual machine 301 forwards, for processing, the service packet of the first virtual machine 304 to a back-end server (the second virtual machine 305) in a manner, for example, by using a load balancing algorithm, and the processing result of the back-end server is sent to the first virtual machine 304. Therefore, the following objective is achieved: In the computer device 300, a load balancing virtual machine created on the computer device 300 implements a load balancing service on devices of the computer device 300. Load balancing processing efficiency is improved.

Figure 5:
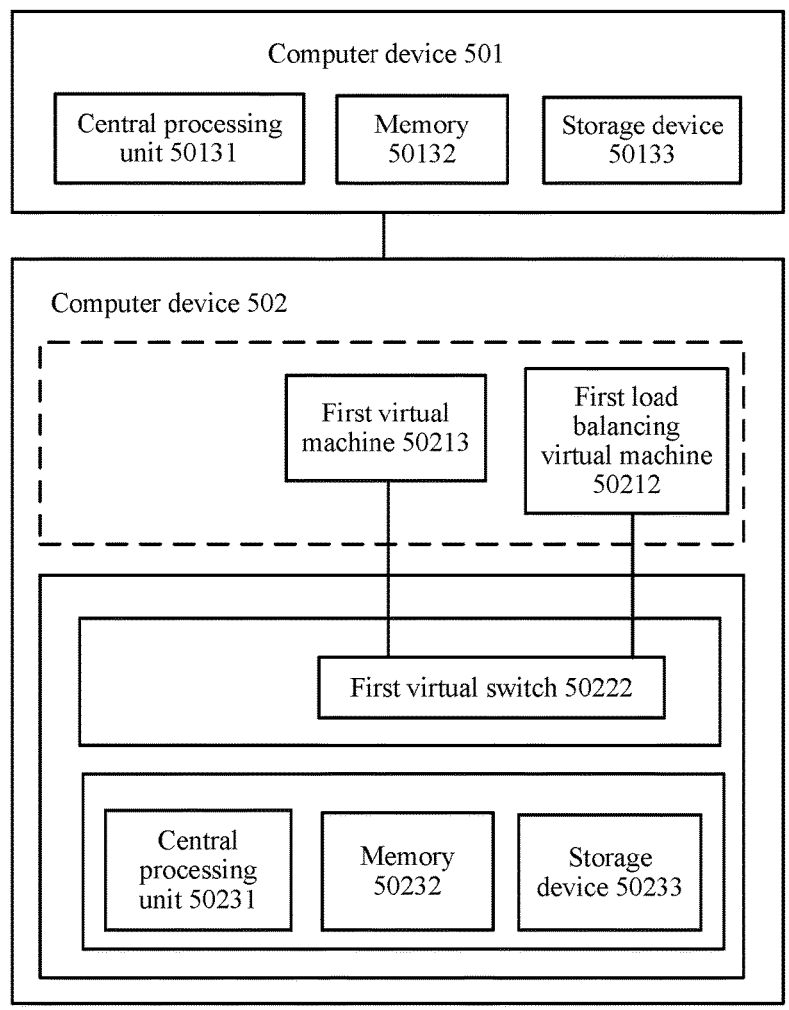
FIG. 5 is a schematic structural diagram of implementation of a first type of computer system according to an embodiment of the present application.

Referring to FIG. 5, FIG. 5 is a schematic structural diagram of implementation of a first type of computer system according to an embodiment of the present application. The system includes a first computer device 502 and a second computer device 501. The second computer device 501 includes a central processing unit (CPU) 50131, a memory 50132, and a storage device 50133. The first computer device 502 includes a central processing unit CPU 50231, a memory 50232, and a storage device 50233. The first computer device 502 further includes a first virtual machine 50213, a first load balancing virtual machine 50212, and a virtual switch 50222 that are generated after hardware-based virtualization. The first virtual machine 50213 and the first load balancing virtual machine 50212 are virtual machines that are created on the computer device 502.

The first virtual machine 50213 is configured to send a service packet.

The first virtual switch 50222 is configured to: receive the service packet sent by the first virtual machine 50213, and forward the service packet only to the first load balancing virtual machine 50212 when load balancing processing needs to be performed on the service packet.

The first load balancing virtual machine 50212 is configured to: receive the service packet forwarded by the first virtual switch 50222, and forward the service packet in a load balancing manner.

The first computer device 502 includes the first load balancing virtual machine 50212. When load balancing processing needs to be performed on a service of a virtual machine of the first computer device 502, a related service packet is sent only to the first load balancing virtual machine 50212 of the first computer device 502 so as to perform load balancing processing. Because load balancing of the related service packet is implemented in the computer device, there is no such a case in which all service packets on multiple computer devices are processed by one load balancing node, thereby avoiding a processing delay caused by congestion of centralized load balancing. In addition, when the first computer device 502 is faulty, the virtual machine of the first computer device 502 goes offline accordingly, and a load balancing requirement is not generated any more. Therefore, when a fault of a single computer device causes a fault of a load balancing virtual machine, a load balancing virtual machine of another computer device is not affected, and there is no service interruption that is caused by active/standby switchover because of the fault of the load balancing virtual machine either.

In this embodiment of the present application, in addition to the central processing unit (CPU) 50131, the memory 50132, and the storage device 50133, the second computer device 501 may include a hardware device such as network hardware (not shown in the figure). The network hardware may be a switching device (such as a network interface card), a router, and/or another network device, and is configured to implement communication between multiple devices. The multiple devices may be connected in a wireless or wired manner.

Optionally, that the first virtual switch 50222 forwards the service packet only to the first load balancing virtual machine 50212 may include:

the first virtual switch 50222 sends a MAC address of the first load balancing virtual machine 50212 to the first virtual machine 50213, so that the first virtual machine 50213 sends the service packet based on the obtained MAC address of the first load balancing virtual machine 50212, and the first virtual switch 50222 forwards the service packet to the first load balancing virtual machine 50212; or the first load balancing virtual machine 50212 sends a MAC address of the first load balancing virtual machine 50212 to the first virtual machine 50213, so that the first virtual machine 50213 sends the service packet based on the MAC address of the first load balancing virtual machine 50212, and the first virtual switch 50222 forwards the service packet to the first load balancing virtual machine 50212; or the first virtual machine 50213 sends the service packet based on a pre-configured MAC address of the first load balancing virtual machine 50212, and the first virtual switch 50222 forwards the service packet to the first load balancing virtual machine 50212.

That the first virtual switch 50222 sends a MAC address of the first load balancing virtual machine 50212 to the first virtual machine 50213 includes:

the first virtual switch 50222 receives a control packet sent by the first virtual machine 50213, and returns a control response packet to the first virtual machine 50213, where the control response packet includes the MAC address of the first load balancing virtual machine 50212.

The control packet may be an ARP packet or an ICMPv6 packet. For example, the first computer device 502 uses the IPv4 protocol. When the first virtual machine 50213 needs to send the service packet, the first virtual machine 50213 first sends the ARP packet to the first virtual switch 50222. The first virtual switch 50222 performs ARP cache, and sends the MAC address of the first load balancing virtual machine 50212 to the first virtual machine 50213. The first virtual machine 50213 sends the service packet to the first load balancing virtual machine 50212 according to the obtained MAC address of the first load balancing virtual machine 50212, with reference to information such as an obtained IP address of the first load balancing virtual machine 50212, and by using the first virtual switch 50222. In this manner, when load balancing processing needs to be performed on the service packet that is sent by the first virtual machine 50213, the service packet is sent only to the first load balancing virtual machine 50212 of the first computer device 502.

Figure 6:
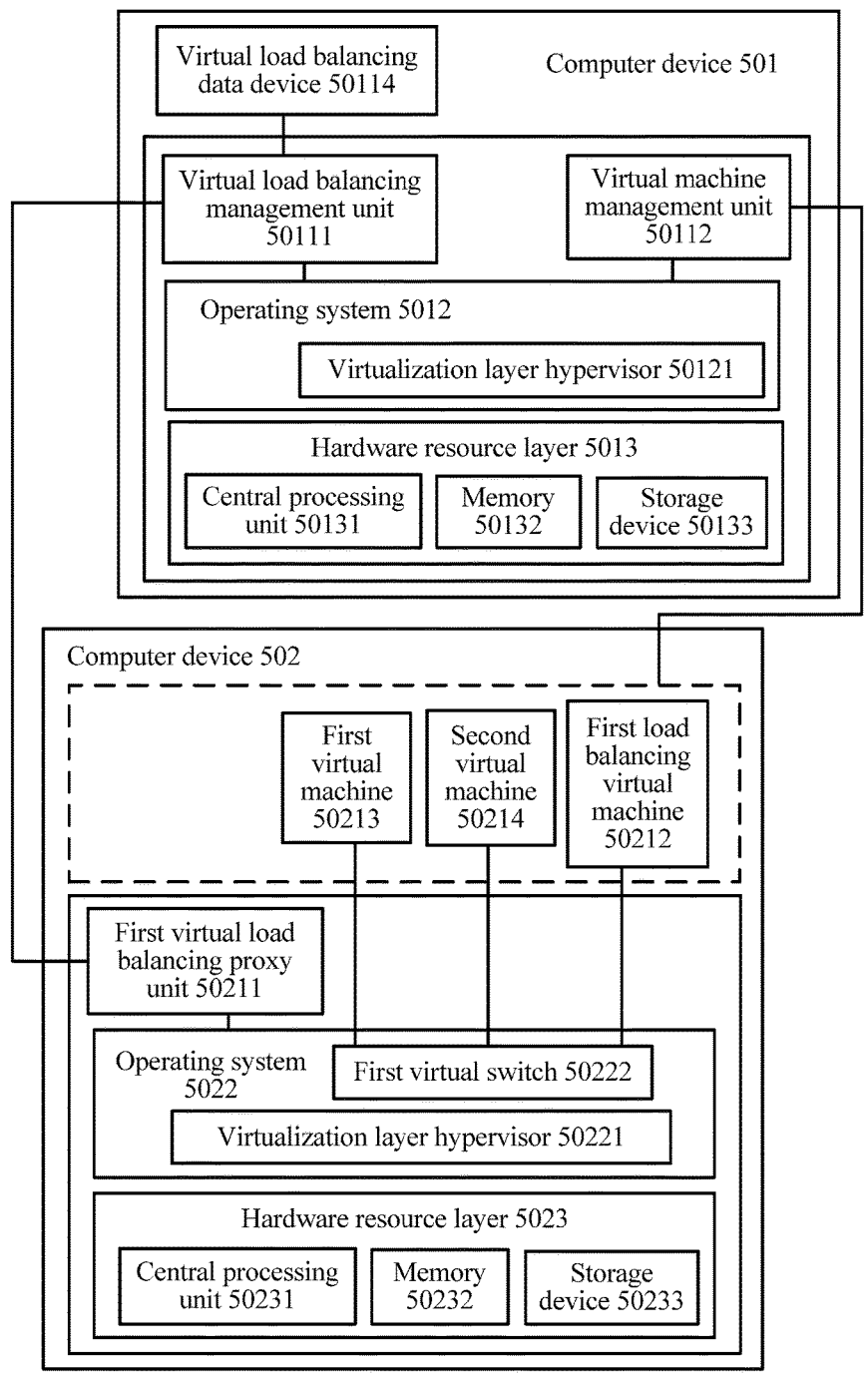
FIG. 6 is an entity diagram of a specific implementation structure of a first type of computer system according to an embodiment of the present application.

FIG. 6 is an entity diagram of a specific implementation structure of a first type of computer system according to an embodiment of the present application. In FIG. 6, a virtualization layer hypervisor 50221 used for virtualization management and the first virtual switch 50222 run on an operating system 5022 of the first computer device 502. The virtualization layer hypervisor 50221 manages virtual machines (such as the first virtual machine 50213) of the first computer device 502. The first virtual switch 50222 provides a network connection function between the virtual machines managed by the hypervisor 50221, and provides a network connection function between a virtual machine and a physical network. A virtual load balancing proxy unit 50111 performs configuration and management on the first load balancing virtual machine 50212 of the first computer device 502 by using the virtualization layer hypervisor 50221. The second computer device 501 is used as a cloud management platform in the computer system, and a virtualization layer hypervisor 50121 used for virtualization management runs on an operating system 5012 of the second computer device 501. The second computer device 501 further includes a virtual machine management unit 50112 and a virtual load balancing management unit 50111. The virtual machine management unit 50112 implements configuration and management on a virtual machine of the second computer device 502. The virtual load balancing management unit 50111 is configured to: receive configuration information for creating a load balancing virtual machine or a virtual machine that is delivered by a user, and store the related configuration information, store configuration information for creating a load balancing virtual machine in a virtual load balancing data device 50114. The first computer device 502 further includes a first virtual load balancing proxy unit 50211.

The virtual load balancing management unit 50111 is configured to: receive configuration information for creating the first load balancing virtual machine 50212, and send the configuration information for creating the first load balancing virtual machine 50212 to the first virtual load balancing proxy unit 50211.

The first virtual load balancing proxy unit 50211 is configured to: receive the configuration information for creating the first load balancing virtual machine 50212, and instruct the virtual machine management unit to create the first load balancing virtual machine 50212 according to the configuration information for creating the first load balancing virtual machine 50212.

The first virtual load balancing proxy unit 50211 may instruct, when the user who creates the first load balancing virtual machine 50212 creates the first virtual machine (such as the first virtual machine 50213) on the first computer device 502, the virtual machine management unit 50112 to create the first load balancing virtual machine 50212. When a last virtual machine that is created on the first computer device 502 by the user who creates the first load balancing virtual machine 50212 is deleted, the first virtual load balancing proxy unit 50211 instructs the virtual machine management unit 50112 to delete the first load balancing virtual machine 50212. In this way, resources in the first computer device 502 can be saved, and hardware resource waste that is caused by creation of a load balancing virtual machine when a load balancing service is not required can be avoided. Specifically, the first virtual load balancing proxy unit 50211 may be implemented with reference to the implementation of the virtual load balancing proxy unit 20211 in FIG. 2B. Details are not described again.

In this embodiment, the first virtual load balancing proxy unit 50211 is further configured to: instruct the virtual machine management unit 50112 to configure a first virtual network interface card for the first load balancing virtual machine 50212 and to establish a connection between the first virtual network interface card and the first virtual switch 50222.

The virtual machine management unit 50112 may establish the connection between the virtual network interface card and the first virtual switch 50222 by configuring a network identifier of the first virtual switch 50222. For example, the first virtual switch 50222 has three network interfaces whose network identifiers are 100. When virtual network interface cards of the first load balancing virtual machine 50212 and the first virtual machine 50213 have interfaces whose network identifiers are 100, the first virtual machine 50213 may communicate by using an interface whose network identifier is 100 and an interface that is of the load balancing virtual machine 20212 and whose network identifier is 100. The virtual machine management unit 50112 may configure a network identifier for the first virtual switch 50222 according to an instruction of the first virtual load balancing proxy unit 50211 or the virtual load balancing management unit 50111.

In this embodiment of the present application, the first virtual machine 50213 is a virtual machine that is created by the user who creates the configuration information of the first load balancing virtual machine 50212. The virtual load balancing management unit 50111 receives configuration information for creating the first virtual machine 50213. When it is determined that the first virtual machine 50213 is the first virtual machine that is created by the user on the first computer device 502, the virtual load balancing management unit 50111 notifies the first virtual load balancing proxy unit 50211 of the information for creating the first virtual machine 50213. When receiving a notification for creating the first virtual machine 50213 that is sent by the virtual load balancing management unit, the first virtual load balancing proxy unit 50211 instructs the virtual machine management unit 50112 to create the first load balancing virtual machine 50212. In this way, resources in the computer device 502 can be saved, and hardware resource occupation and waste that are caused by creation of a load balancing virtual machine when a load balancing service is not required can be avoided. Likewise, when the last virtual machine that is of the computer device 502 and that is created by the user who creates the configuration information of the first load balancing virtual machine 50212 is deleted, the virtual load balancing management unit 50111 notifies the first virtual load balancing proxy unit 50211, and the first virtual load balancing proxy unit 50211 instructs the virtual machine management unit 50112 to delete the first load balancing virtual machine 50212. In this way, resources in the computer device 502 can also be saved, and hardware resource occupation and waste that are caused by a load balancing virtual machine when a load balancing service is not required can be avoided.

In the foregoing, the virtual load balancing management unit 50111 instructs the first virtual load balancing proxy unit 50211 to instruct the virtual machine management unit 50112 to create or delete the first load balancing virtual machine 50212. During specific implementation, the virtual load balancing management unit 50111 may instruct the virtual machine management unit 50112 to create or delete the first load balancing virtual machine 50212. Details are not described.

Optionally, the first computer device 502 further includes a second virtual machine 50214. The second virtual machine 50214 has a capability of processing the service packet of the first virtual machine 50213. When the first load balancing virtual machine 50212 determines, in a load balancing manner, that the second virtual machine 50214 processes the service packet of the first virtual machine 50213, the second virtual machine 50214 receives the service packet forwarded by the first load balancing virtual machine 50212, and sends a result of processing the service packet to the first load balancing virtual machine 50212. The first load balancing virtual machine 50212 sends, to the first virtual machine 50213 by using the first virtual switch 50222, the result of processing the service packet by the second virtual machine 50214.

The first load balancing virtual machine 50212 forwards, for processing, the service packet of the first virtual machine 50213 to a back-end server (the second virtual machine 50214) in a manner, for example, by using a load balancing algorithm, and the processing result of the back-end server is sent to the first virtual machine 50213. Therefore, the following objective is achieved: In the computer device 502, a load balancing virtual machine created on the computer device 502 implements a load balancing service on devices of the computer device 502. Load balancing processing efficiency is improved.

Figure 7A:
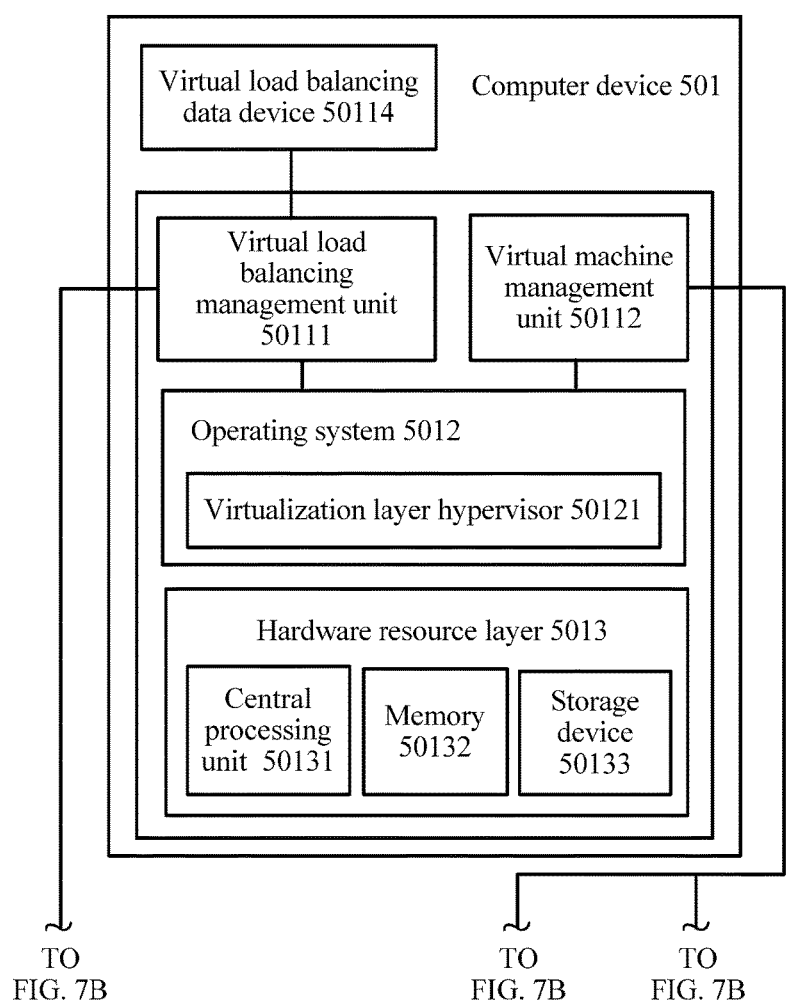
FIG. 7A and FIG. 7B are an entity diagram of another specific implementation structure of a first type of computer system according to an embodiment of the present application.
Figure 7B:
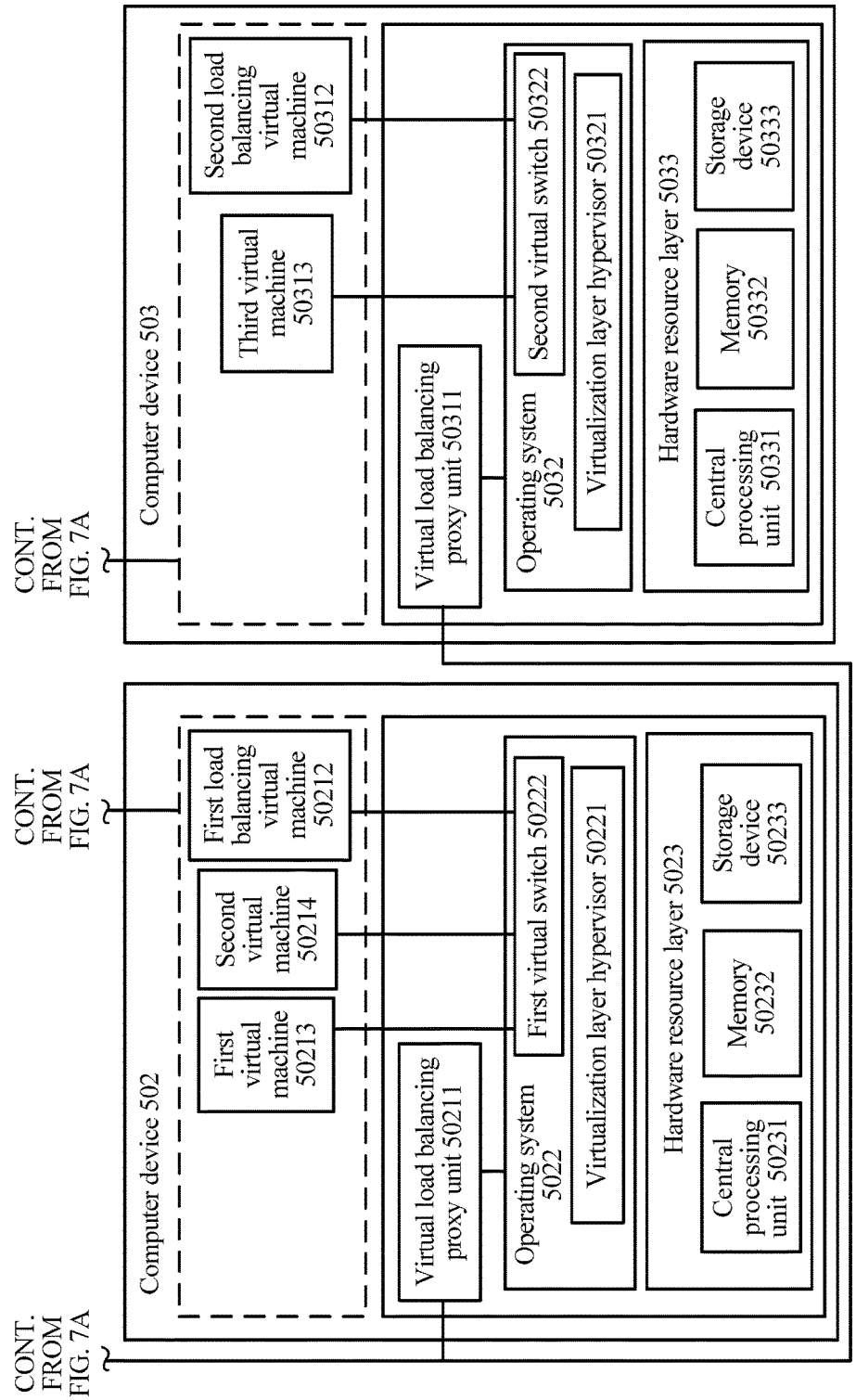

The first computer system in this embodiment of the present application may further include a third computer device. As shown in FIG. 7B, the third computer device 503 is similar to the computer device 502, and includes a second virtual load balancing proxy unit 50311, a second virtual switch 50322, and a third virtual machine 50313.

The second virtual load balancing proxy unit 50311 is configured to: receive configuration information for creating a second load balancing virtual machine 50312 that is sent by the virtual load balancing management unit 50111, instruct, based on the configuration information for creating the second load balancing virtual machine 50312, the virtual machine management unit 50112 to create the second load balancing virtual machine 50312, and instruct the virtual machine management unit 50112 to configure a second virtual network interface card for the second load balancing virtual machine 50312 and to establish a connection between the second virtual network interface card and the second virtual switch 50322.

The second virtual switch 50322 is configured to: receive a second service packet initiated by the third virtual machine 50313, and forward the second service packet only to the second load balancing virtual machine 50312 when load balancing processing needs to be performed on the second service packet.

The second load balancing virtual machine 50312 is configured to: receive the second service packet forwarded by the second virtual switch 50322, and forward the second service packet in a load balancing manner.

Correspondingly, the virtual machine management unit 50112 may configure a first IP address and a first MAC address for the first load balancing virtual machine 50212, and configure a second IP address and a second MAC address for the second load balancing virtual machine. The first IP address may be the same as the second IP address, or the first MAC address may be the same as the second MAC address. In this way, IP address resources or MAC address resources in a network that includes computer devices can be saved, and utilization of the IP address resources or the MAC address resources can be increased.

The embodiment shown in FIG. 5, FIG. 6, FIG. 7A, and FIG. 7B may be implemented with reference to the specific implementation in FIG. 2A and FIG. 2B. Details are not described again.

Optionally, the embodiments of the present application further provide a second type of computer system, including a first computer device (such as the computer device 202 in FIG. 2B or the computer device 502 in FIG. 7B), a second computer device (such as the computer device 201 in FIG. 2A or the computer device 501 in FIG. 7A), and a third computer device (such as the computer device 203 in FIG. 2B or the computer device 503 in FIG. 7B). The first computer device, the second computer device, and the third computer device each include a central processing unit CPU, a memory, and a storage device. The second computer device performs configuration and management on virtual machines of the first computer device and the third computer device. The first computer device includes a first virtual switch. The third computer device includes a second virtual switch.

The second computer device is configured to: receive configuration information for creating a load balancing virtual machine on the first computer device, create a first load balancing virtual machine on the first computer device, and establish a connection between the first load balancing virtual machine and the first virtual switch; and receive configuration information for creating a load balancing virtual machine on the third computer device, create a second load balancing virtual machine on the third computer device, and establish a connection between the second load balancing virtual machine and the second virtual switch.

The first virtual switch is configured to: receive a first service packet sent by a first virtual machine of the first computer device, and forward the first service packet only to the first load balancing virtual machine when load balancing processing needs to be performed on the first service packet.

The second virtual switch is configured to: receive a second service packet sent by a second virtual machine of the third computer device, and forward the second service packet only to the second load balancing virtual machine when load balancing processing needs to be performed on the second service packet.

The second computer system includes the first computer device, the second computer device, and the third computer device. The second computer device separately creates the first load balancing virtual machine on the first computer device, and creates the second load balancing virtual machine on the third computer device, so that each computer device has a load balancing virtual machine that processes a load balancing service on the computer device, and load balancing processing of a service packet sent by a virtual machine of each computer device is performed only on a load balancing virtual machine of the computer device. In this way, there is no such a case in which all service packets on multiple computer devices are processed by one load balancing node, thereby avoiding a processing delay caused by congestion of centralized load balancing. In addition, when a computer device is faulty, a virtual machine of the computer device goes offline accordingly, and a load balancing requirement is not generated any more. Therefore, when a fault of a single computer device causes a fault of a load balancing virtual machine, a load balancing virtual machine of another computer device is not affected, and there is no service interruption that is caused by active/standby switchover because of the fault of the load balancing virtual machine either.

In the second computer system, that the first virtual switch forwards the first service packet only to the first load balancing virtual machine includes:
the first virtual switch sends a MAC address of the first load balancing virtual machine to the first virtual machine, so that the first virtual machine sends the service packet based on the obtained MAC address of the first load balancing virtual machine, and the first virtual switch forwards the service packet to the first load balancing virtual machine; or the first load balancing virtual machine sends a MAC address of the first load balancing virtual machine to the first virtual machine, so that the first virtual machine sends the service packet based on the MAC address of the first load balancing virtual machine, and the first virtual switch forwards the service packet to the first load balancing virtual machine; or the first virtual machine sends the service packet based on a pre-configured MAC address of the first load balancing virtual machine, and the first virtual switch forwards the service packet to the first load balancing virtual machine.

Correspondingly, that the first virtual switch sends a MAC address of the first load balancing virtual machine to the first virtual machine includes:
the first virtual switch receives a control packet sent by the first virtual machine, and returns a control response packet to the first virtual machine, where the control response packet includes the MAC address of the first load balancing virtual machine. The control packet may be an ARP packet or an ICMPv6 packet.

Optionally, the first computer device further includes a second virtual machine, and the second virtual machine has a capability of processing the service packet of the first virtual machine.

When the first load balancing virtual machine determines, in a load balancing manner, that the second virtual machine processes the service packet of the first virtual machine, the second virtual machine receives the service packet forwarded by the first load balancing virtual machine, and sends a result of processing the service packet to the first load balancing virtual machine.

The first load balancing virtual machine is further configured to send, to the first virtual machine by using the first virtual switch, the result of processing the service packet by the second virtual machine.

In this embodiment of the present application, an IP address of the first load balancing virtual machine is the same as an IP address of the second load balancing virtual machine, or the MAC address of the first load balancing virtual machine is the same as a MAC address of the second load balancing virtual machine. In this way, IP address resources or MAC address resources in the second computer system can be saved, and resource utilization can be increased.

Figure 8:
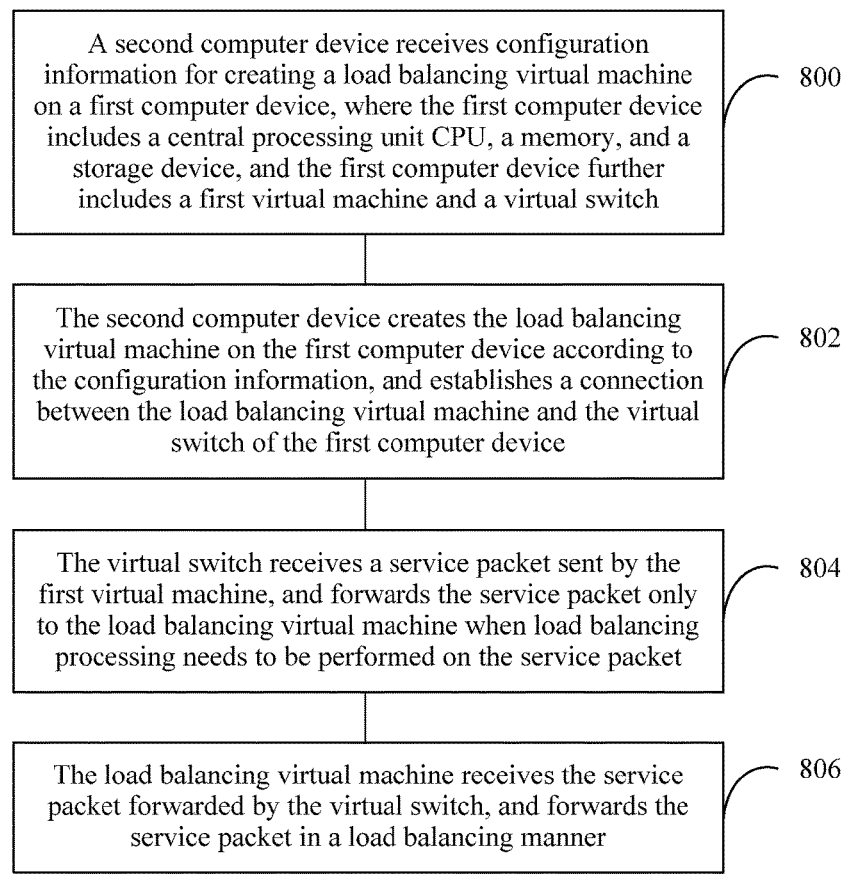
FIG. 8 is a flowchart of a load balancing method according to an embodiment of the present application.

Referring to FIG. 8, FIG. 8 is a schematic flowchart of a load balancing method according to an embodiment of the present application. As shown in FIG. 8, the method includes the following steps:

Step 800: A second computer device receives configuration information for creating the load balancing virtual machine on a first computer device, where the first computer device includes a central processing unit CPU, a memory, and a storage device, and the first computer device further includes a first virtual machine and a virtual switch.

Step 802: The second computer device creates the load balancing virtual machine on the first computer device according to the configuration information, and establishes a connection between the load balancing virtual machine and the virtual switch of the first computer device.

Step 804: The virtual switch receives a service packet sent by the first virtual machine, and forwards the service packet only to the load balancing virtual machine when load balancing processing needs to be performed on the service packet.

Step 806: The load balancing virtual machine receives the service packet forwarded by the virtual switch, and forwards the service packet in a load balancing manner.

In the foregoing method, the first computer device includes the load balancing virtual machine. When load balancing processing needs to be performed on a service initiated by a virtual machine of the first computer device, a related service packet is sent only to the load balancing virtual machine of the first computer device so as to perform load balancing processing. Because load balancing of the related service packet is implemented in the computer device, there is no such a case in which all service packets on multiple computer devices are processed by one load balancing node, thereby avoiding a processing delay caused by congestion of centralized load balancing. In addition, when the first computer device is faulty, the virtual machine of the first computer device goes offline accordingly, and a load balancing requirement is not generated any more. Therefore, when a fault of a single computer device causes a fault of a load balancing virtual machine, a load balancing virtual machine of another computer device is not affected, and there is no service interruption that is caused by active/standby switchover because of the fault of the load balancing virtual machine either.

Optionally, in the foregoing step 804, that the virtual switch forwards the service packet only to the load balancing virtual machine includes:

sending, by the virtual switch, a MAC address of the load balancing virtual machine to the first virtual machine, so that the first virtual machine sends the service packet based on the obtained MAC address of the load balancing virtual machine, and forwarding, by the virtual switch, the service packet to the load balancing virtual machine; or sending, by the load balancing virtual machine, a MAC address of the load balancing virtual machine to the first virtual machine, so that the first virtual machine sends the service packet based on the obtained MAC address of the load balancing virtual machine, and forwarding, by the virtual switch, the service packet to the load balancing virtual machine; or sending, by the first virtual machine, the service packet based on a pre-configured MAC address of the load balancing virtual machine, and forwarding, by the virtual switch, the service packet to the load balancing virtual machine.

The sending, by the virtual switch, a MAC address of the load balancing virtual machine to the first virtual machine may include:

receiving, by the virtual switch, a control packet sent by the first virtual machine, and returning a control response packet to the first virtual machine, where the control response packet includes the MAC address of the load balancing virtual machine. The control packet may be an ARP packet or an ICMPv6 packet.

Before the second computer device creates the load balancing virtual machine on the first computer device according to the configuration information, the method further includes:

sending, by the second computer device, the configuration information to the first computer device; and receiving, by the first computer device, the configuration information for creating a load balancing virtual machine, and instructing the second computer device to create the load balancing virtual machine.

In this embodiment of the present application, the second computer device further includes a second virtual machine, the second virtual machine has a capability of processing the service packet of the first virtual machine, and the method further includes:

when the load balancing virtual machine determines, by using a load balancing algorithm, that the second virtual machine processes the service packet of the first virtual machine, receiving, by the second virtual machine, the service packet forwarded by the load balancing virtual machine, and sending a result of processing the service packet to the load balancing virtual machine; and sending, by the load balancing virtual machine to the first virtual machine by using the virtual switch, the result of processing the service packet by the second virtual machine.

The second virtual machine and the first virtual machine are located on one computer device. In this way, bandwidth occupation caused by inter-computer device service processing can be reduced, and service processing efficiency can be improved.

The method embodiment in the embodiments of the present application may be implemented with reference to the implementation of the embodiment shown in FIG. 2A and FIG. 2B. Details are not described again.

The following describes in detail, with reference to an application scenario shown in FIG. 2A and FIG. 2B, the implementation of the load balancing method in this embodiment of the present application by using the following example: A user applies for a virtual machine 20213 of a computer device 202, the virtual machine 20213 is used to implement a specific service (for example, access a video service), the service may be processed by a back-end server such as a virtual machine 20214 of the computer device 202 or a virtual machine 20314 of a computer device 203, and load balancing needs to be performed between the virtual machine 20214 and the virtual machine 20314 on a service that is initiated by the virtual machine 20213.

Figure 9:
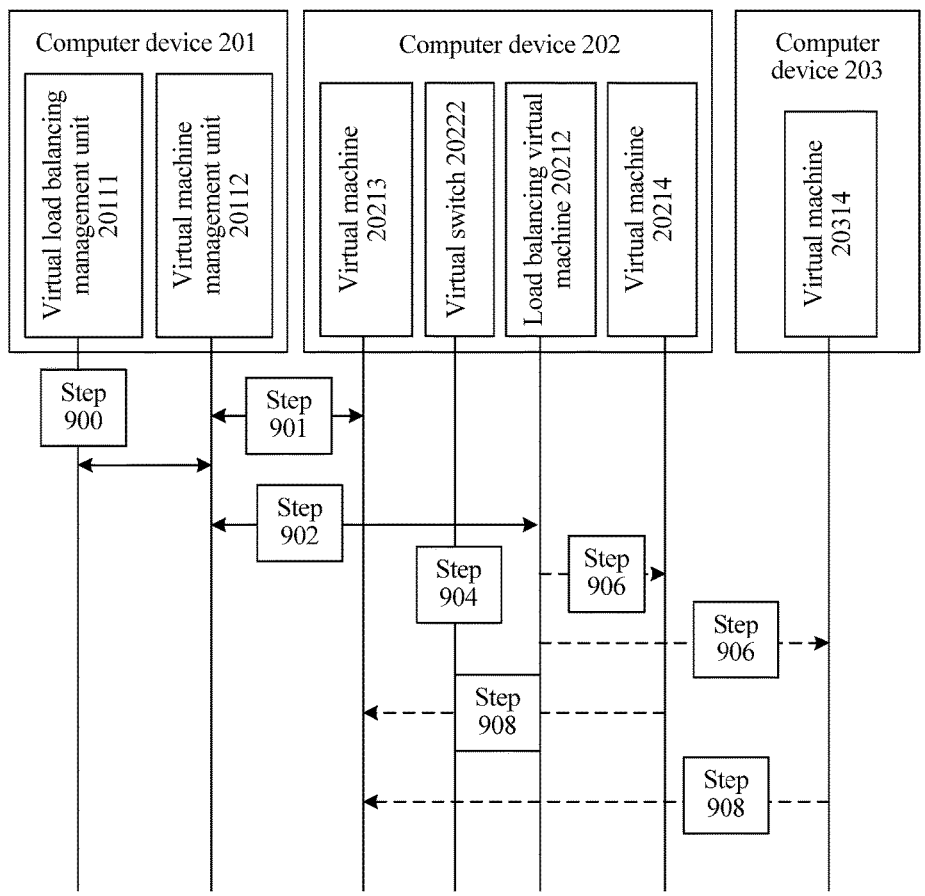
FIG. 9 is a flowchart of a load balancing method according to another embodiment of the present application.

FIG. 9 is a schematic flowchart of an implementation process. It should be noted that the implementation process shown in FIG. 9 is described still by using an implementation in which a virtual machine that has a load balancing function is used as a load balancer. An implementation in which the load balancer is implemented by using a container, a namespace, or the like may be implemented with reference to the following implementation in which a virtual machine is used as the load balancer.

As shown in FIG. 9, a method for implementing a load balancing service in an embodiment of the present application includes the following steps.

Step 900: A computer device 201 obtains configuration information for creating a load balancing virtual machine on a computer device 202.

Step 902: The computer device 201 creates a load balancing virtual machine 20212 on the computer device 202 according to the obtained configuration information of the load balancing virtual machine.

Step 904: Configure a forwarding mode of a load balancing service on the computer device 202, so that a service initiated by a virtual machine 20213 is forwarded only to the load balancing virtual machine 20212 that is created on the computer device 202, so as to perform load balancing processing.

The service initiated by the virtual machine 20213 is a load balancing service, and the load balancing service is a service on which load balancing processing needs to be performed.

Step 906: The load balancing virtual machine 20212 receives the service sent by the virtual machine 20213, and selects a back-end server to process the service initiated by the virtual machine 20213.

Step 908: The back-end server returns, to the virtual machine 20213, the processed service initiated by the virtual machine 20213.

In step 900, the computer device 201 is used as a cloud management platform, and can obtain configuration information of a load balancing virtual machine that needs to be created, for example, configuration information for creating a load balancing virtual machine that is delivered by a user by using software that is related to the cloud management platform and that runs on the computer device 201, or configuration information of a load balancing virtual machine that is pre-stored in the computer device 201. In addition, the computer device 201 is used as the cloud management platform, and may further obtain configuration information of another service virtual machine such as the virtual machine 20213 of the computer device 202. A manner in which the computer device 201 obtains the configuration information of the service virtual machine also includes receiving the configuration information pre-stored in the computer device 201 or the configuration information that is delivered by the user by using the software related to the cloud management platform.

Because the user applies for the virtual machine 20213 of the computer device 202 by using the cloud management platform in this embodiment of the present application, load balancing processing needs to be performed on a service request initiated by the virtual machine 20213. To avoid a prior-art disadvantage such as congestion caused by a centralized load balancing node, in this embodiment of the present application, the load balancing virtual machine 20212 is created on the computer device 202, and the load balancing virtual machine 20212 processes the service request that is initiated by the virtual machine 20213 and on which load balancing processing needs to be performed. Therefore, in step 900, the computer device 201 needs to obtain the configuration information for creating a load balancing virtual machine on the computer device 202, that is, configuration information of the load balancing virtual machine 20212, and configures the load balancing virtual machine on the computer device 202 according to the obtained configuration information of the load balancing virtual machine.

In this embodiment of the present application, the configuration information of the load balancing virtual machine includes but is not limited to an identifier of the load balancing virtual machine 20212 or a VIP address of the load balancing virtual machine 20212. The VIP of the load balancing virtual machine 20212 indicates a load balancing service. For example, when an IP address of the load balancing virtual machine 20212 is configured as the VIP, the load balancing virtual machine 20212 can be used as a node that processes the load balancing service, and can be addressed. Optionally, in this embodiment of the present application, the configuration information of the load balancing virtual machine further includes information about a back-end server related to the load balancing virtual machine 20212, or the like.

Optionally, the configuration information may further include virtual machine parameter information. The virtual machine parameter information includes but is not limited to information such as a quantity of virtual central processing units, a size of a virtual memory, and a logical network on which the load balancing virtual machine 20212 is located.

The virtual machine parameter information may be a pre-configured parameter list, and different parameter lists may be selected according to different requirements. The parameter list may be specified when the user delivers configuration information, or may be obtained by the computer device 201 from a stored configuration information list according to a preset policy. This embodiment of the present application imposes no limitation on a manner of obtaining the virtual machine parameter information of the load balancing virtual machine 20212.

In step 902, the computer device 201 creates the load balancing virtual machine 20212 according to the obtained configuration information of the load balancing virtual machine.

The computer device 201 is used as the cloud management platform, can create an ordinary virtual machine on the computer device 202, and can also create a load balancing virtual machine. The computer device 201 can create the load balancing virtual machine 20212 on the computer device 202 according to the obtained configuration information of the load balancing virtual machine 20212.

Optionally, the method may further include step 901: The computer device 201 creates the virtual machine 20213 on the computer device 202. The virtual machine 20213 is a service virtual machine created by the user, and the virtual machine 20213 is a virtual machine that initiates a service. The service initiated by the virtual machine 20213 includes a load balancing service, that is, a load balancing service initiated by the virtual machine 20213 is a service on which load balancing processing needs to be performed.

When the user who delivers the configuration information for creating a load balancing virtual machine creates the first virtual machine on the computer device 202, for example, creates the first virtual machine 20213 that initiates a load balancing service, the computer device 201 creates the load balancing virtual machine 20212. When a last virtual machine created by the user is deleted, for example, when the last virtual machine 20213 that initiates a load balancing service is deleted, the computer device 201 deletes the load balancing virtual machine 20212. In this way, the load balancing virtual machine 20212 is created only when the user creates a virtual machine that initiates a load balancing service, so that a problem that occupation of resources in the computer device 202 is caused by creation of a load balancing virtual machine when the user does not create a virtual machine can be avoided, and resource utilization of the computer device 202 can be increased.

The computer device 201 may determine, according to information about the user such as identification information of the user, whether the created virtual machine is the first service virtual machine that is created by the user who has configured the virtual load balancing service.

Likewise, it may also be determined, according to the information about the user, whether the last service virtual machine created by the user who has configured the virtual load balancing service is deleted. Details are not described.

In step 902, that the computer device 201 creates the load balancing virtual machine 20212 according to the obtained configuration information of the load balancing virtual machine further includes: the computer device 201 configures a virtual network interface card for the load balancing virtual machine 20212 according to network information in the configuration information of the load balancing virtual machine.

In step 904, the computer device 201 may configure the forwarding mode of the load balancing service on the computer device 202. In the forwarding mode, a service packet of the load balancing service initiated by the virtual machine such as the virtual machine 20213 that is of the computer device 202 and that initiates the service is directionally forwarded to the load balancing virtual machine 20212.

The computer device 201 may configure the forwarding mode of the load balancing service on the computer device 202 by configuring a forwarding mode of a virtual switch of the computer device 202. The virtual switch of the computer device 202 is a virtual switch 20222. In the configured forwarding mode of the virtual switch 20222, directional forwarding processing is performed on the service packet that is sent by the virtual machine 20213 and on which load balancing processing needs to be performed, and the service packet that is sent by the virtual machine 20213 and on which load balancing processing needs to be performed is sent only to the load balancing virtual machine 20212 of the computer device 202. Optionally, the forwarding mode of the virtual switch 20222 may be an ARP or NDP cache mode, that is, the virtual switch 20222 directionally forwards the service packet in the ARP or NDP cache mode.

When the virtual machine 20213 initiates the service packet of the load balancing service, the virtual machine 20213 sends the service packet of the load balancing service to the load balancing virtual machine 20212 according to the forwarding mode of the load balancing service. Specifically, when initiating a load balancing service on which load balancing processing needs to be performed, the virtual machine 20213 may first send a control packet for which a VIP is used as a destination IP. The control packet may be a broadcast packet of the load balancing service. Usually, the control packet that is initiated by the virtual machine 20213 and for which the VIP is used as the destination IP is forwarded to all load balancing nodes (such as load balancers) whose IP addresses are VIPs. However, in this embodiment of the present application, because the computer device 201 configures the forwarding mode of the load balancing service on the computer device 202, after receiving the control packet sent by the virtual machine 20213, the virtual switch 20222 of the computer device 202 sends a MAC address of the load balancing virtual machine 20212 only to the virtual machine 20213. The virtual machine 20213 sends the service packet of the load balancing service to the load balancing virtual machine 20212 according to the obtained MAC address of the load balancing virtual machine 20212. Therefore, the service initiated by the virtual machine 20213 is forwarded only to the load balancing virtual machine 20212 created on the computer device 202, so as to perform load balancing processing.

Optionally, the control packet that the virtual switch 20213 sends to the virtual switch 20222 before sending the service packet may be an ARP packet or an ICMP packet.

In this embodiment of the present application, an implementation of an ARP cache technology is described by using, as an example, a cloud platform that supports OpenStack. When initiating, for the first time, the service on which load balancing processing is performed, the virtual machine 20213 first sends the control packet to the virtual switch 20222, for example, first sends an ARP request packet to the virtual switch 20222, and the virtual switch 20222 performs ARP cache. When the virtual machine 20213 initiates, for the first time, the service on which load balancing processing is performed, the virtual machine 20213 does not know a MAC address of a load balancing virtual machine that processes the load balancing service, and knows only a VIP address of the load balancing service. Therefore, when initiating, for the first time, the service on which load balancing processing is performed, the virtual machine 20213 first sends an ARP request, so as to obtain the MAC address of the load balancing virtual machine that processes the load balancing service.

A destination IP of the ARP request packet is a VIP. The VIP is an IP address that can be accessed by a load balancing virtual machine. A destination MAC address of the ARP request packet may be a MAC address of a general-purpose load balancing virtual machine. The MAC is not a MAC address of a specific load balancing virtual machine, and the destination MAC address may be empty. The ARP cache technology is implemented by using a flow table. A flow table technology usually includes two parts: a matching condition and actions. The matching condition of the ARP cache flow table is as follows: A protocol type is ARP, an ARP destination protocol address is a VIP, the VIP is an IP address that can be accessed by a load balancing virtual machine, and an ARP operation type is an ARP request. When performing ARP cache on the ARP request sent by the virtual machine 20213, the virtual switch 20222 returns the MAC address of the load balancing virtual machine 20212 to the virtual machine 20213.

After the virtual switch 20222 sends an ARP reply packet to the virtual machine 20213, the virtual machine 20213 sends a service packet on which load balancing processing needs to be performed, an IP address of the service packet is a VIP address, and a MAC address of the service packet is the MAC of the load balancing virtual machine 20212 that is obtained from the ARP reply of the virtual switch 20222. The virtual machine 20213 sends the service packet to the virtual switch 20222. After receiving the service packet sent by the virtual machine 20213, the virtual switch 20222 sends the service packet to the load balancing virtual machine 20212 according to the MAC address carried in the service packet.

The virtual switch 20222 receives the service packet sent by the virtual machine 20213, and sends the service packet to the load balancing virtual machine 20212 according to the IP address and the MAC address of the service packet. A load balancing virtual machine (such as a load balancing virtual machine 20312) of another computer device (such as a computer device 203) does not receive the service packet of the virtual machine 20213, and does not process the service packet that is sent by the virtual machine 20213 and on which load balancing processing needs to be performed. Therefore, the following objective is achieved: When load balancing processing needs to be performed on a service packet of a virtual machine of each computer device, the service packet is implemented only on a load balancing virtual machine of the computer device.

In an optional implementation, the computer device 201 may configure the forwarding mode of the load balancing service on the computer device 202 in the following manner:

The computer device 201 instructs the load balancing virtual machine 20212 to send a MAC address of the load balancing virtual machine 20212 to the virtual machine (such as the virtual machine 20213) that initiates the service; or the computer device 201 configures a MAC address of the load balancing virtual machine 20212 of the virtual machine (such as the virtual machine 20213) that initiates the service.

When the computer device 201 instructs the load balancing virtual machine 20212 to send the MAC address of the load balancing virtual machine 20212 to the virtual machine (such as the virtual machine 20213) that initiates the service, the virtual machine (such as the virtual machine 20213) that initiates the service uses the received MAC address of the load balancing virtual machine 20212 as a destination MAC address used when the load balancing service is initiated. When the computer device 201 configures the MAC address of the load balancing virtual machine 20212 on the virtual machine (such as the virtual machine 20213) that initiates the service, the configured MAC address of the load balancing virtual machine 20212 is a destination MAC address used when the virtual machine (such as the virtual machine 20213) that initiates the service sends the load balancing service.

In step 906, that the load balancing virtual machine 20212 receives the service sent by the virtual machine 20213, and selects the back-end server to process the service initiated by the virtual machine 20213 may include the following implementation steps: After receiving the service packet, the load balancing virtual machine 20212 first determines whether a back-end server has been allocated to the service packet to serve the service packet, and if the back-end server has been allocated, sends the service packet to the back-end server that has been allocated. If the back-end server has not yet been allocated, a back-end server is selected by using a load balancing algorithm, to serve the service packet. The load balancing algorithm includes but is not limited to round robin, weighted round robin, a random algorithm, least connections, source address hash, or location-based weighted round robin. In the location-based weighted round robin manner, a back-end server of a computer device on which a virtual machine that initiates a service packet is located may be preferentially selected, that is, a virtual machine 20214 of the computer device 202 is used as a back-end server that processes the service of the virtual machine 20213. In this way, a speed of processing the service packet by the back-end server can be increased, and network bandwidth can be saved. Certainly, in step 906, alternatively, the load balancing virtual machine 20212 may process the service request of the virtual machine 20213 by using a load balancing algorithm, and then sends the service request to a virtual machine 20314 of the computer device 203. The virtual machine 20314 is used as a back-end server that processes the service of the virtual machine 20213, and processes the service initiated by the virtual machine 20213.

It should be noted that a dashed line of step 906 in FIG. 9 indicates an alternative, that is, the load balancing virtual machine 20212 may forward, to a back-end server of the computer device 202, that is, the virtual machine 20214, the service initiated by the virtual machine 20213, or may forward the service to a back-end server of the computer device 203, that is, the virtual machine 20314.

In step 908, the back-end server may return the processed service request to the virtual machine 20213 in the following two manners:

Manner 1: The back-end server that processes the service request of the virtual machine 20213 returns a processing result to the virtual machine 20213 by using the load balancing virtual machine 20212.

Manner 2: The back-end server that processes the service request of the virtual machine 20213 directly returns a processing result to the virtual machine 20213 without using the load balancing virtual machine 20212.

In the manner 1, when forwarding the service request of the virtual machine 20213 to the back-end server that processes the service request of the virtual machine 20213, the load balancing virtual machine 20212 writes a source address (including an IP address, an MAC address, and the like) of the service request as an address of the load balancing virtual machine 20212, and writes a destination address as an address of the back-end server that processes the service request of the virtual machine 20213. In this way, the back-end server that processes the service request of the virtual machine 20213 returns the result of processing the service request to the load balancing virtual machine 20212 according to the source address carried when the service request is received, and then, the load balancing virtual machine 20212 returns the received and processed service request to the virtual machine 20213.

In the manner 2, when forwarding the service request of the virtual machine 20213 to the back-end server that processes the service request of the virtual machine 20213, the load balancing virtual machine 20212 writes a source address (including an IP address, an MAC address, and the like) as an address of the virtual machine 20213, and writes a destination address as an address of the back-end server that processes the service request of the virtual machine 20213. In this way, the back-end server that processes the service request of the virtual machine 20213 returns the result of processing the service request to the virtual machine 20213 according to the source address carried when the service request is received.

It should be noted that a dashed line of step 908 in FIG. 9 indicates an alternative, that is, when the load balancing virtual machine 20212 forwards, to the back-end server of the computer device 202, that is, the virtual machine 20214 in step 906, the service initiated by the virtual machine 20213, the virtual machine 20214 returns the processed service request to the virtual machine 20213. When the load balancing virtual machine 20212 forwards, to the back-end server of the computer device 203, that is, the virtual machine 20314 in step 906, the service initiated by the virtual machine 20213, the virtual machine 20314 returns the processed service request to the virtual machine 20213.

In this embodiment of the present application, the computer device 202 and the computer device 203 are also referred to as service computer devices. A virtual machine that runs on the computer device 202 or the computer device 203 or both, for example, the virtual machine 20213 is also referred to as a virtual machine that initiates a service, and the service initiated by the virtual machine includes a load balancing service.

An implementation process from step 900 to step 908 is described by using an example in which the computer device 201 that is used as the cloud management platform creates the load balancing virtual machine 20212 on the computer device 202. It may be understood that a process in which the computer device 201 creates the load balancing virtual machine 20312 on the computer device 203 is similar to the foregoing process. Details are not described again.

In this way, the computer device 201 can separately create load balancing virtual machines on the computer device 202 and the computer device 203. A service packet of a load balancing service that is initiated by a service virtual machine (such as the virtual machine 20213 or a virtual machine 20313) of each service computer device (such as the computer device 202 and the computer device 203) is directionally forwarded to a local load balancing virtual machine. That is, a load balancing service initiated by the service virtual machine 20213 of the service computer device 202 is forwarded only to a local load balancing virtual machine (that is, the load balancing virtual machine 20212) of the computer device 202, so as to implement the load balancing service. A load balancing service initiated by the service virtual machine 20313 of the service computer device 203 is forwarded only to a local load balancing virtual machine (that is, the load balancing virtual machine 20312) of the computer device 203, so as to implement the load balancing service.

Therefore, the IP address of the load balancing virtual machine 20212 of the service computer device 202 may be the same as an IP address of the load balancing virtual machine 20312 of the service computer device 203. Likewise, the MAC address of the load balancing virtual machine 20212 of the service computer device 202 may be the same as a MAC address of the load balancing virtual machine 20312 of the service computer device 203. In this way, IP address resources and/or MAC address resources in a network that includes computer devices can be saved.

Persons of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is only an example. For example, the unit division is only logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes instructions for instructing a computer device (which may be a personal computer, a server, or a network device) to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are only specific embodiments of the present application, but are not intended to limit the protection scope of the present application. Any modification or replacement readily figured out by persons skilled in the art within the technical scope disclosed in the present application shall fall within the protection scope of the present application. Therefore, the protection scope of the present application shall be subject to the protection scope of the claims.

What is claimed is:

1. A method for balancing load among devices, applied to a computer system that comprises at least a first computer device and a second computer device, wherein the first computer device comprises a cloud management platform, and the second computer device comprises at least one virtual machine; the method comprising:
    obtaining, by the first computer device, configuration information of a load balancer, wherein the configuration information of the load balancer comprises an identifier of the load balancer and a virtual IP address (VIP) of the load balancer;
    instructing, by the first computer device, the second computer device to create the load balancer according to the configuration information;
    configuring, by the first computer device, a forwarding mode of a service on the second computer device, wherein the service is initiated by the virtual machine, and wherein in the forwarding mode, a service packet of the service is forwarded to the load balancer;
    receiving, by the load balancer, the service packet of the service from the virtual machine; and
    selecting, by the load balancer, at least one back-end server to execute the service.

2. The method according to claim 1, wherein configuring the forwarding mode of the service on the second computer device comprises:
    configuring, by the first computer device, a virtual switch on the second computer device;
    wherein the virtual switch is configured to send a media access control (MAC) address of the load balancer to the virtual machine and the virtual machine forwards the service packet of the service to the MAC address of the load balancer.

3. The method according to claim 2, wherein sending the MAC address of the load balancer to the virtual machine comprises:
    sending, by the virtual machine, a control packet to the virtual switch, wherein the control packet carries the VIP; and
    sending, by the virtual switch, a response message of the control packet to the virtual machine, wherein the response message carries the MAC address of the load balancer.

4. The method according to claim 1, wherein configuring the forwarding mode of the service on the second computer device comprises:

instructing, by the first computer device, the load balancer to send a media access control (MAC) address of the load balancer to the virtual machine.

5. The method according to claim 1, wherein configuring the forwarding mode of the load balancing service on the second computer device comprises:
configuring, by the first computer device, a media access control (MAC) address of the load balancer on the virtual machine.

6. A method for balancing load among devices, applied to a computer system that comprises at least a first computer device and a second computer device, wherein the first computer device comprises a cloud management platform, and the second computer device comprises at least one virtual machine; the method comprising:
obtaining, by the first computer device, configuration information of a load balancer, wherein the configuration information of the load balancer comprises an identifier of the load balancer and a virtual IP address (VIP) of the load balancer;
instructing, by the first computer device, the second computer device to create the load balancer according to the configuration information; and
configuring, by the first computer device, a forwarding mode of a service on the second computer device;
wherein the service is initiated by the virtual machine, wherein in the forwarding mode, a service packet of the service is forwarded to the load balancer, and wherein after receiving the service packet, the load balancer selects a back-end server for executing the service.

7. The method according to claim 6, wherein configuring the forwarding mode of the service on the second computer device comprises:
configuring, by the first computer device, a virtual switch on the second computer device;
wherein the virtual switch is configured to send a media access control (MAC) address of the load balancer to the virtual machine, and the virtual machine forwards the service packet of the service to the MAC address of the load balancer.

8. The method according to claim 7, wherein sending the MAC address of the load balancer to the virtual machine comprises:
sending, by the virtual machine, a control packet to the virtual switch, wherein the control packet carries the VIP; and
sending, by the virtual switch, a response message of the control packet to the virtual machine, wherein the response message carries the MAC address of the load balancer.

9. A computer system, comprising at least a first computer device and a second computer device, the first computer device comprises a cloud management platform, and the second computer device comprises at least one virtual machine,
wherein the first computer device is configured to:
obtain configuration information of a load balancer, wherein the configuration information of the load balancer comprises an identifier of the load balancer and a virtual IP address (VIP) of the load balancer;

instruct the second computer device to create the load balancer according to the configuration information; and
configure a forwarding mode of a service on the second computer device, wherein the service is initiated by the virtual machine, and wherein in the forwarding mode, a service packet of the service is forwarded to the load balancer;
wherein the second computer device is configured to:
provide a media access control (MAC) address of the load balancer to the virtual machine, and
enable the load balancer to select at least one back-end server for forwarding the service packet of the service from the virtual machine to the back-end server.

10. The computer system according to claim 9, wherein in configuring the forwarding mode of the service, the first computer device is configured to:
set a virtual switch on the second computer device; and
wherein the virtual switch is configured to send the MAC address of the load balancer to the virtual machine and the virtual machine is configured to forward the service packet of the service to the MAC address of the load balancer.

11. The computer system according to claim 10, wherein the virtual machine is configured to send a control packet to the virtual switch, the control packet carries the VIP; and
wherein the virtual switch is configured to send a response message of the control packet to the virtual machine, the response message carries the MAC address of the load balancer.

12. A computer device, comprising a processor and a memory,
wherein a hypervisor runs on the computer device, the hypervisor bears a load balancer and at least one virtual machine, the load balancer provides a load balancing service for the virtual machine;
wherein the computer device is configured to:
receive configuration information of the load balancer, the configuration information of the load balancer comprises an identifier of the load balancer and a virtual IP address VIP of the load balancer;
create the load balancer according to the configuration information; and
configure a forwarding mode of the load balancing service, wherein in the forwarding mode, a service packet of a service initiated by the virtual machine is forwarded to the load balancer;
wherein the load balancer receives the service packet from the virtual machine and selects at least one back-end server to execute the service for the virtual machine.

13. The computer device according to claim 12, wherein in configuring the forwarding mode of the service, the computer device is configured to:
deploy a virtual switch;
wherein the virtual switch is configured to:
receive a control packet from the virtual machine, the a control packet carries the VIP; and
send a response message of the control packet to the virtual machine, the response message carries the MAC address of the load balancer.

* * * * *